US008542936B2

(12) United States Patent
Suzuki et al.

(10) Patent No.: US 8,542,936 B2
(45) Date of Patent: Sep. 24, 2013

(54) IMAGE ENCODING AND DECODING DEVICE

(75) Inventors: Yoshinori Suzuki, Saitama (JP); Choong Seng Boon, Yokohama (JP); Thiow Keng Tan, Jalan Sindor (SG)

(73) Assignee: NTT DoCoMo, Inc., Tokyo (JP)

( * ) Notice: Subject to any disclaimer, the term of this patent is extended or adjusted under 35 U.S.C. 154(b) by 67 days.

(21) Appl. No.: 13/212,035

(22) Filed: Aug. 17, 2011

(65) Prior Publication Data

US 2011/0299788 A1 Dec. 8, 2011

Related U.S. Application Data

(63) Continuation of application No. PCT/JP2009/071671, filed on Dec. 25, 2009.

(30) Foreign Application Priority Data

Feb. 18, 2009 (JP) .................................. 2009-035339

(51) Int. Cl.
*G06K 9/36* (2006.01)
*G06K 9/46* (2006.01)

(52) U.S. Cl.
USPC ............ 382/238; 382/232; 382/233; 382/239

(58) Field of Classification Search
USPC ................... 382/232–253; 348/394.1–420.1; 375/240.01–240.29; 358/426.01–426.14
See application file for complete search history.

(56) References Cited

U.S. PATENT DOCUMENTS

| 5,724,451 | A | 3/1998 | Shin et al. .................. 382/240 |
| 6,084,908 | A * | 7/2000 | Chiang et al. ............ 375/240.03 |
| 6,157,746 | A | 12/2000 | Sodagar et al. ............... 382/240 |
| 6,765,964 | B1 | 7/2004 | Conklin .................. 375/240.14 |

(Continued)

FOREIGN PATENT DOCUMENTS

| JP | 08-111869 A | 4/1996 |
| JP | 2005-530375 | 10/2005 |
| JP | 2006-186995 | 7/2006 |
| WO | WO 2010/095341 A1 | 8/2010 |

OTHER PUBLICATIONS

Vaisey, J. Gersho, A. "Image compression with variable block size segmentation", IEEE Transactions on Signal Processing, 1992, vol. 40, Issue: 8 pp. 2040-2060.*

International Search Report issued in PCT Application No. PCT/JP2009/071671, with English translation of cited references page only (11 pages), Feb. 23, 2010.

(Continued)

*Primary Examiner* — Li Liu
(74) *Attorney, Agent, or Firm* — Brinks Hofer Gilson & Lione

(57) ABSTRACT

A picture encoding device may include a unit for selecting a division method of a target region, and a unit for dividing the target region into small regions using the division method, generating a prediction signal in the small region, generating a residual signal between the prediction signal and the original signal of the small region, generating quantized transform coefficients by performing frequency transform and quantization of the residual signal, selecting a map for mapping the quantized transform coefficients of the small region onto leaves of a tree structure that is common to a plurality of division methods in accordance with attribute information of the small region, mapping the quantized transform coefficients of the small region onto the leaves of the tree structure based on the map, and updating the states of the nodes and leaves of the tree structure according to the coefficient values of the respective leaves.

16 Claims, 22 Drawing Sheets

(56) References Cited

U.S. PATENT DOCUMENTS

| | | | |
|---|---|---|---|
| 7,003,035 B2 | 2/2006 | Tourapis et al. | 375/240.12 |
| 7,702,013 B2 | 4/2010 | Schwarz et al. | 375/240.02 |
| 2004/0062309 A1 | 4/2004 | Romanowski et al. | |
| 2006/0133680 A1 | 6/2006 | Bossen | 382/240 |
| 2010/0310185 A1* | 12/2010 | Liu et al. | 382/239 |
| 2010/0310186 A1* | 12/2010 | Liu et al. | 382/239 |
| 2012/0106628 A1* | 5/2012 | Sole et al. | 375/240.02 |

OTHER PUBLICATIONS

Extended European Search Report for European Application No. 09840444.5, dated Aug. 2, 2012, 8 pages.

Extended European Search Report for European Application No. 13155379.4, dated Jun. 13, 2013, 9 pages.

Chinese Office Action, dated Aug. 2, 2013, pp. 1-13, Chinese Patent Application No. 200980155740.X, State Intellectual Property Office of People's Republic of China, Beijing, China.

* cited by examiner

IMAGE ENCODING AND DECODING DEVICE

This application is a continuation of PCT/JP2009/071671, filed Dec. 25, 2009, which claims the benefit of the filing date pursuant to 35 U.S.C. §119(e) of JP2009-035339, filed Feb. 18, 2009, both of which are incorporated herein by reference.

TECHNICAL FIELD

The present invention relates to a picture encoding device, method and program, and a picture decoding device, method and program.

BACKGROUND ART

In order to efficiently transmit and accumulate picture data (still picture data and moving picture data), compression of picture data by compression encoding technology has been performed in the related art. As such compression encoding technology, for example, methods, such as MPEG1 to 4, H.261 to H.264, and the like, have been widely used in the case of the moving picture data.

SUMMARY OF INVENTION

Prediction efficiency may be improved by performing a prediction process with various prediction methods having different block shapes or block sizes. On the other hand, in performing entropy encoding of a residual signal, the encoding process may be performed with a small number of encoding elements or a small encoding table in the case where data having similar statistical properties are gathered and processed by a uniform probability model.

However, if the entropy encoding is performed with a small number of encoding elements, in the case of generating a prediction signal with various methods (various block sizes), the statistical degree of freedom of the respective encoding elements becomes large, and thus it is difficult to obtain a uniform probability model that is suitable to the entropy encoding of the residual signal. As a result, it is difficult to efficiently perform the entropy encoding of the residual signal.

Efficient performance of entropy encoding of the residual signal while performing a prediction process with an appropriate prediction block size or shape may include processing with a common tree structure having nodes and leaves.

Since prediction signals may be generated in different block sizes or shapes, quantized transform coefficients having different statistical properties may be transformed into states of the nodes and leaves in the common tree structure, and zero tree encoding may be performed using a probability model that is common to the different block sizes or different block shapes. Also, in an example embodiment of an encoding and decoding device includes a map for mapping the quantized transform coefficients in the block on the leaves of the tree structure may be individually prepared with respect to each block having a different block size or shape in order to suppress the statistical difference between the states of the nodes and leaves in the tree structure.

A picture encoding device according to an example embodiment of the image encoding and decoding device may include at least one of: a region division unit for dividing an input picture into a plurality of regions; a division method selection unit for selecting a division method of a target region to be processed, the target region being one of the plurality of regions, and the division method selected from among a plurality of division methods. The picture encoding device may further include a division method encoding unit for encoding information identifying the selected division method; a small region division unit for dividing the target region into a plurality of small regions using the selected division method; a prediction unit for generating a prediction signal with respect to an original signal that is included in the small region; a residual signal generation unit for generating a residual signal representing a difference between the prediction signal and the original signal in the small region; a transform unit for performing frequency transform of the residual signal in the small region to generate transform coefficients; and a quantization unit for quantizing the transform coefficients of the small region to generate quantized transform coefficients. The picture encoding device may further include a zero tree mapping unit for preparing a tree structure that is common to at least two of the plurality of division methods, and for selecting at least one map, which is determined based on attribute information of the small region. The map selected from among a plurality of maps for mapping the quantized transform coefficients of the small region on leaves of the tree structure. The zero tree mapping unit may also be used for mapping the quantized transform coefficients of the small region on the leaves of the tree structure based on the selected map, and updating the states of the nodes and leaves of the tree structure in accordance with the coefficient values of the respective leaves. The picture encoding device may further include a zero tree encoding unit for performing entropy encoding of the states of the nodes and leaves of the tree structure using, for example, a probability model that is common to at least two of the plurality of division methods; a non-zero coefficient encoding unit for performing entropy encoding of non-zero quantized transform coefficients of the small region; and an output unit for outputting at least one of encoded data comprising identification of the selected division method, encoded data in the states of the nodes and leaves of the tree structure, and encoded data of the non-zero quantized transform coefficients of the small region. In this case, the attribute information of the small region may be the selected division method of the target region. In other examples any one or more of the units may be omitted from the picture encoding device.

A picture decoding device according to an embodiment of the image encoding and decoding device may include: a data analysis unit for extracting encoded data that indicates a division method of a target region to be processed and encoded data of a residual signal of a small region. The encoded data of the residual signal may be obtained by dividing the target region. The encoded data may be extracted from compressed data. The picture decoding device may also include a division method decoding unit for performing entropy decoding of information identifying the division method of the target region from among a plurality of division methods, the information identified from the encoded data that indicates the division method of the target region. The picture decoding device may further include a zero tree decoding unit for preparing a tree structure that is common to at least two of the division methods. The zero tree decoding unit may also be for performing entropy decoding of the states of the nodes and leaves of the tree structure using, for example, a probability model that is common to at least two of the plurality of division methods. The states of the nodes and the leaves decode from the encoded data of the residual signal of the small region. The picture decoding device may further include a non-zero coefficient decoding unit for performing entropy decoding of decoded values of quantized transform coefficients, of which the decoded value of the state of the leaves of the tree structure are non-zero, such as one. The decoded values of the quantized transform coefficients may be decoded from the encoded data of the residual signal of the small region. The picture decoding device may further include a zero tree quantized transform coefficient mapping unit for selecting at least one map. The at least one map may be determined from among a plurality of maps for mapping the quantized transform coefficients of the small region on the leaves of the tree structure. Determination of the at least one map may be based on fully decoded attribute information of the small region. The zero tree quantized transform coefficient mapping unit may also be used for restoring decoded values of the states of the nodes and leaves of the decoded tree structure and the quantized transform coefficients of the decoded small region to reproduction quantized transform coefficients of the small region based on the selected map.

The picture decoding device may further include a de-quantization unit for performing de-quantization of the reproduction quantized transform coefficients of the small region to generate reproduction frequency transform coefficients, and an inverse-transform unit for performing inverse-transformation of the reproduction frequency transform coefficients of the small region to restore a reproduction residual signal. The picture decoding device may further include a prediction unit for generating a prediction signal with respect to an original signal that is included in the small region, and a picture restoration unit for restoring the reproduction signal of the small region by adding the prediction signal of the small region and the reproduction residual signal. In this case, the fully decoded attribute information of the small region may be the division method of the target region to be decoded. In other examples, one or more of the units may be omitted from the picture decoding device.

Additionally or alternatively an embodiment of the image encoding and decoding device may include a picture encoding device that may include a region division unit for dividing an input picture into a plurality of regions, and a division method selection unit for selecting a division method of a target region to be processed. The target region being at least one of the plurality of regions, and the selected division method being from among a plurality of division methods. Alternatively, or in addition the picture encoding device may include a division method encoding unit for encoding information for identifying the selected division method, a small region division unit for dividing the target region into a plurality of small regions using the selected division method, a prediction unit for generating a prediction signal with respect to an original signal that is included in the respective small regions of the target region, and a residual signal generation unit for generating a residual signal between the prediction signal and the original signal in the respective small regions of the target region. Alternatively, or in addition, the picture encoding device may include a transform unit for performing frequency transformation of the residual signal in the respective small regions of the target region in order to generate transform coefficients, a quantization unit for quantizing the transform coefficients in the respective small regions of the target region in order to generate quantized transform coefficients, and a zero tree mapping unit for preparing a tree structure that is common to at least two of the plurality of division methods. Alternatively, or in addition, the zero tree mapping unit may be used for selecting at least one map, which is determined based on attribute information of the target region, from among a plurality of maps for mapping the quantized transform coefficients in the target region on leaves of the tree structure. Alternatively, or in addition, the zero tree mapping unit may be used for mapping the quantized transform coefficients in the target region on the leaves of the tree structure based on the selected map, and/or for updating the states of the nodes and leaves of the tree structure in accordance with the coefficient values of the respective leaves. Alternatively, or in addition, the picture encoding device may include a zero tree encoding unit for performing entropy encoding of the states of the nodes and leaves of the tree structure using, for example, a probability model that is common to at least two of the plurality of division methods, a non-zero coefficient encoding unit for performing entropy encoding of non-zero quantized transform coefficients in the respective small regions of the target region, and an output unit for outputting encoded data. The encoded data including at least one of information for identifying the selected division method, encoded data representing the states of the nodes and leaves of the tree structure, and encoded data representing the non-zero quantized transform coefficients in the respective small regions of the target region. In this case, the attribute information of the target region may be the selected division method of the target region. In other examples, one or more of the units may be omitted from the picture decoding device.

Alternatively, or additionally, the image encoding and decoding device may include a picture decoding device that may include a data analysis unit for extracting encoded data that indicates a division method of a target region to be processed, and encoded data of a residual signal of the target region. In some embodiments, the encoded data may be extracted from compressed data. Alternatively, or in addition, the picture decoding device may include a division method decoding unit for performing entropy decoding of information for identifying the division method of the target region from among a plurality of division methods. The division method may be decoded from the encoded data that indicates the division method of the target region. Alternatively, or in addition, the picture decoding device may include a zero tree decoding unit for preparing a tree structure that is common to at least two of the division methods and for performing entropy decoding of the states of the nodes and leaves of the tree structure using, for example, a probability model that is common to at least two of the plurality of division methods. The states of the nodes and the leaves decoded from the encoded data of the residual signal of the target region. Alternatively, or in addition, the picture decoding device may include a non-zero coefficient decoding unit for performing entropy decoding of decoded values of quantized transform coefficients when the state of the leaves of the decoded tree structure is non-zero, such as one. The decoded values of quantized transform coefficients are decoded from the encoded data of the residual signal of the target region. Alternatively, or in addition, the picture decoding device may include a zero tree quantized transform coefficient mapping unit for selecting at least one map, which is determined based on attribute information of the target region, from among a plurality of maps for mapping the quantized transform coefficients of the target region on the leaves of the tree structure. Alternatively, or in addition, the zero tree quantized transform coefficient mapping unit may also be used for transforming decoded values of the states of the nodes and leaves of the decoded tree structure and the quantized transform coefficients of the decoded target region into reproduction quantized transform coefficients of respective small regions of the target region based on the selected map. Alternatively, or in addition, the picture decoding device may include a de-quantization unit for performing de-quantization of the reproduction quantized transform coefficients in the respective small regions of the target region in order to generate reproduction frequency transform coefficients, and an inverse-transform unit for performing inverse-transform of the reproduction frequency transform coefficients in the respective small regions of the target region in order to restore a reproduction residual signal. Alternatively, or in addition, the picture decoding device may include a prediction unit for generating a prediction signal with respect to an original signal in the small regions of the target region, a picture restoration unit for restoring the reproduction signal in the small regions of the target region to generate a reproduced picture signal, by adding the prediction signal in the respective small regions of the target region and the reproduction residual signal, and a region integration unit for integrating the reproduced picture signals in the respective small regions of the target region to generate a reproduced picture signal of the target region. In this case, the attribute information of the target region may be the division method of the decoded target region. In other examples, one or more of the units may be omitted from the picture decoding unit.

Alternatively, or in addition, the image encoding and decoding device may include an embodiment of a picture encoding method that is performed by a picture encoding device and includes steps of: dividing an input picture into a plurality of regions, and selecting a division method of a target region to be processed. The target region being from among the plurality of regions, and the division method selected from among a plurality of division methods. Alternatively, or in addition, the picture encoding method may include encoding information for identifying the selected division method; and dividing the target region into a plurality of small regions using the selected division method. Alternatively, or in addition, the picture encoding method may include generating a prediction signal with respect to an original signal that is included in the small region; generating a residual signal indicative of a difference between the prediction signal and the original signal in the small region; performing frequency transformation of the residual signal in the small region to generate transform coefficients; quantizing the transform coefficients of the small region to generate quantized transform coefficients. Alternatively, or in addition, the picture encoding method may include preparing a tree structure that is common to at least two of the plurality of division methods, selecting at least one map, which is determined based on the selected division method of the target region, from among a plurality of maps for mapping the quantized transform coefficients of the small region on leaves of the tree structure; mapping the quantized transform coefficients of the small region on the leaves of the tree structure based on the selected map, and updating the states of the nodes and leaves of the tree structure in accordance with the coefficient values of the respective leaves. Alternatively, or in addition, the picture encoding method may include performing entropy encoding of the states of the nodes and leaves of the tree structure with, for example, a probability model that is common to at least two of the plurality of division methods; performing entropy encoding of non-zero quantized transform coefficients of the small region; and outputting at least one of encoded data identifying the selected division method, encoded data indicating the states of the nodes and leaves of the tree structure, and encoded data indicating the non-zero quantized transform coefficients of the small region.

A picture encoding program according to an example embodiment of the image encoding and decoding device may be stored in a non-transitory computer readable medium executable by a computer, the computer readable medium comprising one or more of: a region division unit executable for dividing an input picture into a plurality of regions, and a division method selection unit executable for selecting a division method of a target region to be processed. The target region included in the plurality of regions, and the division method selected from among a plurality of division methods. The computer readable medium may further include a division method encoding unit executable for encoding information for identifying the selected division method, and a small region division unit executable for dividing the target region into a plurality of small regions using the selected division method. The computer readable medium may further include a prediction unit executable for generating a prediction signal with respect to an original signal that is included in the small region, and a residual signal generation unit executable for generating a residual signal representative of a difference between the prediction signal and the original signal in the small region. The computer readable medium may further include a transform unit executable for performing frequency transformation of the residual signal in the small region to generate transform coefficients, and a quantization unit executable for quantizing the transform coefficients of the small region to generate quantized transform coefficients. The computer readable medium may further include a zero tree mapping unit executable for preparing a tree structure that is common to at least two of the plurality of division methods. Alternatively or in addition, the zero tree mapping unit may be executable for selecting at least one map, which is determined based on the selected division method of the target region. The map selected from among a plurality of maps for mapping the quantized transform coefficients of the small region on leaves of the tree structure. In addition, or alternatively, the zero tree mapping unit may be executable for mapping the quantized transform coefficients of the small region on the leaves of the tree structure based on the selected map, and updating the states of the nodes and leaves of the tree structure in accordance with the coefficient values of the respective leaves. The computer readable medium may further include a zero tree encoding unit executable for performing entropy encoding of the states of the nodes and leaves of the tree structure with a probability model that is common to at least two of the plurality of division methods, a non-zero coefficient encoding unit for performing entropy encoding of non-zero quantized transform coefficients of the small region, and an output unit for outputting encoded data. The encoded data comprising at least one of information for identifying the selected division method, encoded data indicative of the states of the nodes and leaves of the tree structure, and encoded data indicative of the non-zero quantized transform coefficients of the small region.

Alternatively, or in addition an embodiment of a picture encoding method may be performed by a picture encoding device and may include steps of: dividing an input picture into a plurality of regions, selecting a target region from among the plurality of regions, selecting a division method of a target region from among a plurality of division methods, and encoding information for identifying the selected division method. Alternatively, or in addition, the method may include dividing the target region into a plurality of small regions in the selected division method, generating a prediction signal with respect to an original signal that is included in each of the respective small regions of the target region, and generating a residual signal between the prediction signal and the original signal in the respective small regions of the target region. Alternatively, or in addition the method may include performing frequency transformation of the residual signal in the respective small regions of the target region to generate transform coefficients, and quantizing the transform coefficients in the respective small regions of the target region to generate quantized transform coefficients. Alternatively, or in addition the method may include preparing a tree structure that is common to at least two of the plurality of division methods, selecting at least one map, which may be determined based on the selected division method of the target region, from among a plurality of maps for mapping the quantized transform coefficients in the target region on leaves of the tree structure, mapping the quantized transform coefficients in the target region on the leaves of the tree structure based on the selected map, and updating the states of the nodes and leaves of the tree structure in accordance with the coefficient values of the respective leaves. Alternatively, or in addition the method may include performing entropy encoding of the states of the nodes and leaves of the tree structure with a probability model that is common to at least two of the plurality of division methods, performing entropy encoding of non-zero quantized transform coefficients in the respective small regions of the target region, and outputting encoded data. The encoded data comprising at least one of information for identifying the selected division method, encoded data in the states of the nodes and leaves of the tree structure, and encoded data of the non-zero quantized transform coefficients in the respective small regions of the target region. In other examples, one or more steps of the previously described method may be omitted from the encoding program.

A picture encoding program according to another example embodiment of the encoding and decoding device may be stored in a non-transitory computer readable medium executable by a computer, the computer readable medium comprising one or more of: a region division unit executable for dividing an input picture into a plurality of regions, and a division method selection unit executable for selecting a division method of a target region. The target region being included in the plurality of regions, and the division method selected from among a plurality of division methods. The computer readable medium may also include a division method encoding unit executable for encoding information for identifying the selected division method, and a small region division unit executable for dividing the target region into a plurality of small regions in the selected division method. The computer readable medium may further include a prediction unit executable for generating a prediction signal with respect to an original signal that is included in the respective small regions of the target region, a residual signal generation unit executable for generating a residual signal representative of a difference between the prediction signal and the original signal in each of the respective small regions of the target region, a transform unit executable for performing frequency transform of the residual signal in the respective small regions of the target region to generate transform coefficients, and a quantization unit executable for quantizing the transform coefficients in the respective small regions of the target region to generate quantized transform coefficients. The computer readable medium may further include a zero tree mapping unit executable for preparing a tree structure that is common to at least two of the plurality of division methods. Alternatively, or in addition, the zero tree mapping unit may be further executable for selecting at least one map, which is determined based on the selected division method of the target region, from among a plurality of maps for mapping the quantized transform coefficients in the target region on leaves of the tree structure. Alternatively, or in addition, the zero tree mapping unit may be further executable for mapping the quantized transform coefficients in the target region on the leaves of the tree structure based on the selected map, and for updating the states of the nodes and leaves of the tree structure in accordance with the coefficient values of the respective leaves. The computer readable medium may further include a zero tree encoding unit executable for performing entropy encoding of the states of the nodes and leaves of the tree structure using a probability model that is common to at least two of the plurality of division methods, a non-zero coefficient encoding unit executable for performing entropy encoding of non-zero quantized transform coefficients in the respective small regions of the target region, and an output unit executable for outputting encoded data. The encoded data comprising at least one of information for identifying the selected division method, encoded data in the states of the nodes and leaves of the tree structure, and encoded data of the non-zero quantized transform coefficients in the respective small regions. In other examples, one or more of the units may be omitted from the computer readable medium.

Alternatively, or in addition, the image encoding and decoding device may include an embodiment of a picture decoding method that includes steps of: extracting encoded data that indicates a division method of a target region to be processed and encoded data of a residual signal of a small region that is obtained by dividing the target region. The encoded data may be extracted from compressed data, and the division method is one of a plurality of division methods. Alternatively, or in addition, the method may include performing entropy decoding of information identifying the division method of the target region from the encoded data, preparing a tree structure that is common to at least two of the division methods, and performing entropy decoding of the states of the nodes and leaves of the tree structure with a probability model that is common to at least two of the plurality of division methods. The states of the nodes and leaves may be decoded from the encoded data of the residual signal of the small region. Alternatively, or in addition, the method may include performing entropy decoding of decoded values of quantized transform coefficients, for which the state of the leaves of the decoded tree structure is a non-zero value, such as one. The decoded values of quantized transform coefficients may be decoded from the encoded data of the residual signal of the small region. Alternatively, or in addition, the method may include selecting at least one map, which is determined based on the division method of the decoded target region, from among a plurality of maps for mapping the quantized transform coefficients of the small region on the leaves of the tree structure, and restoring decoded values of the states of the nodes and leaves of the decoded tree structure and the quantized transform coefficients of the decoded small region to reproduction quantized transform coefficients of the small region based on the selected map. Alternatively, or in addition, the method may include performing de-quantization of the reproduction quantized transform coefficients of the small region to generate reproduction frequency transform coefficients, performing inverse-transform of the reproduction frequency transform coefficients of the small region to restore a reproduction residual signal, generating a prediction signal with respect to an original signal that is included in the small region, and restoring the reproduction signal of the small region by adding the prediction signal of the small region and the reproduction residual signal. In other examples, one or more steps of the previously described decoding method may be omitted.

A picture decoding program according to another example embodiment of the encoding and decoding device may be stored in a non-transitory computer readable medium executable by a computer, the computer readable medium comprising one or more of: a data analysis unit executable for extracting encoded data that indicates a division method of a target region to be processed, and encoded data of a residual signal of a small region that is obtained by dividing the target region. The encoded data may be extracted from compressed data. The computer readable medium may also include a division method decoding unit executable for performing entropy decoding of information for identifying the division method of the target region. The division method may be identified from among a plurality of division methods, and the information decoded from the encoded data that indicates the division method of the target region. The computer readable medium may further include a zero tree decoding unit executable for preparing a tree structure that is common to at least two of the division methods and for performing entropy decoding of the states of the nodes and leaves of the tree structure using a probability model that is common to at least two of the plurality of division methods. The states of the nodes and the leaves of the tree structure may be decoded from the encoded data of the residual signal of the small region. The computer readable medium may further include a non-zero coefficient decoding unit executable for performing entropy decoding of decoded values of quantized transform coefficients for which the state of the leaves of the decoded tree structure is a non-zero value such as one. The decoded values of quantized transform coefficients may be decoded from the encoded data of the residual signal of the small region. The computer readable medium may further include a zero tree quantized transform coefficient mapping unit executable for selecting at least one map, which is determined based on the division method of the decoded target region, from among a plurality of maps for mapping the quantized transform coefficients of the small region on the leaves of the tree structure. The zero tree quantized transform coefficient mapping unit may be further executable for restoring decoded values of the states of the nodes and leaves of the decoded tree structure and the quantized transform coefficients of the decoded small region to reproduction quantized transform coefficients of the small region based on the selected map. The computer readable medium may further include a de-quantization unit executable for performing de-quantization of the reproduction quantized transform coefficients of the small region to generate reproduction frequency transform coefficients, an inverse-transform unit executable for performing inverse-transformation of the reproduction frequency transform coefficients of the small region to restore a reproduction residual signal, a prediction unit executable for generating a prediction signal with respect to an original signal that is included in the small region; and a picture restoration unit for restoring the reproduction signal of the small region by adding the prediction signal of the small region and the reproduction residual signal. In other examples, one or more of the units may be omitted from the computer readable medium.

Alternatively, or in addition, the image encoding and decoding device may include an embodiment of a picture decoding method that that includes steps of: extracting encoded data that indicates a division method of a target region to be processed and encoded data of a residual signal of the target region. The encoded data is extracted from compressed data. The method may also include performing entropy decoding of information for identifying the division method of the target region from the encoded data that indicates the division method of the target region. The division method may be included among a plurality of division methods. The method may further include preparing a tree structure that is common to at least two of the division methods, and performing entropy decoding of the states of the nodes and leaves of the tree structure with a probability model that is common to at least two of the plurality of division methods. The states of the nodes and leaves of the tree structure may be decoded from the encoded data of the residual signal of the target region. The method may further include performing entropy decoding of decoded values of quantized transform coefficients for which the state of the leaves of the decoded tree structure are a non-zero value, such as one. The decoded values of quantized transform coefficients may be decoded from the encoded data of the residual signal of the target region. The method may further include selecting at least one map, which may be determined based on the division method of the decoded target region, from among a plurality of maps for mapping the quantized transform coefficients of the target region on the leaves of the tree structure, and transforming decoded values of the states of the nodes and leaves of the decoded tree structure and the quantized transform coefficients of the decoded target region into reproduction quantized transform coefficients of respective small regions of the target region based on the selected map. The method may further include performing de-quantization of the reproduction quantized transform coefficients in the respective small regions of the target region to generate reproduction frequency transform coefficients, and performing inverse-transform of the reproduction frequency transform coefficients in the respective small regions of the target region to restore a reproduction residual signal. The method may further include generating a prediction signal with respect to an original signal that is included in the small regions of the target region, restoring the reproduction signal in the small regions of the target region to generate a reproduced picture signal, by adding the prediction signal in the respective small regions of the target region and the reproduction residual signal, and integrating the reproduced picture signals in the respective small regions of the target region to generate a reproduced picture signal of the target region. In other examples, one or more of the steps of the method may be omitted.

A picture decoding program according to another example embodiment of the encoding and decoding device may be stored in a non-transitory computer readable medium executable by a computer, the computer readable medium comprising one or more of a data analysis unit executable for extracting encoded data that indicates a division method of a target region to be processed and encoded data of a residual signal of the target region. The encoded data may be extracted from compressed data. The computer readable medium may further include a division method decoding unit executable for performing entropy decoding of information for identifying the division method of the target region from the encoded data that indicates the division method of the target region. The division method may be one of a plurality of available division methods. The computer readable medium may further include a zero tree decoding unit executable for preparing a tree structure that is common to at least two of the division methods, and executable for performing entropy decoding of the states of the nodes and leaves of the tree structure using a probability model that is common to at least two of the plurality of division methods. The states of the nodes and leaves may be decoded from the encoded data of the residual signal of the target region. The computer readable medium may further include a non-zero coefficient decoding unit executable for performing entropy decoding of decoded values of quantized transform coefficients where the state of the leaves of the decoded tree structure are a non-zero value, such as one. The decoded values of quantized transform coefficients decoded from the encoded data of the residual signal of the target region. The computer readable medium may further include a zero tree quantized transform coefficient mapping unit executable for selecting at least one map, which is determined based on the division method of the decoded target region, from among a plurality of maps for mapping the quantized transform coefficients of the target region on the leaves of the tree structure. The zero tree quantized transform coefficient mapping unit may further be executable for transforming decoded values of the states of the nodes and leaves of the decoded tree structure and the quantized transform coefficients of the decoded target region into reproduction quantized transform coefficients of respective small regions of the target region based on the selected map. The computer readable medium may further include a de-quantization unit for performing de-quantization of the reproduction quantized transform coefficients in the respective small regions of the target region to generate reproduction frequency transform coefficients, and an inverse-transform unit executable for performing inverse-transformation of the reproduction frequency transform coefficients in the respective small regions of the target region to restore a reproduction residual signal. The computer readable medium may further include a prediction unit executable for generating a prediction signal with respect to an original signal that is included in the small regions of the target region; a picture restoration unit executable for restoring the reproduction signal in the small regions of the target region to generate a reproduced picture signal, by adding the prediction signal in the respective small regions of the target region and the reproduction residual signal, and a region integration unit executable for integrating the reproduced picture signals in the respective small regions of the target region to generate a reproduced picture signal of the target region.

According to the present invention, since zero tree encoding is performed with a common tree structure with respect to a prediction signal generated in a plurality of division methods, a prediction process is performed with an appropriate prediction block size or shape, and it is possible to efficiently performing entropy encoding of a residual signal.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

DESCRIPTION OF EMBODIMENTS

Figure 1:
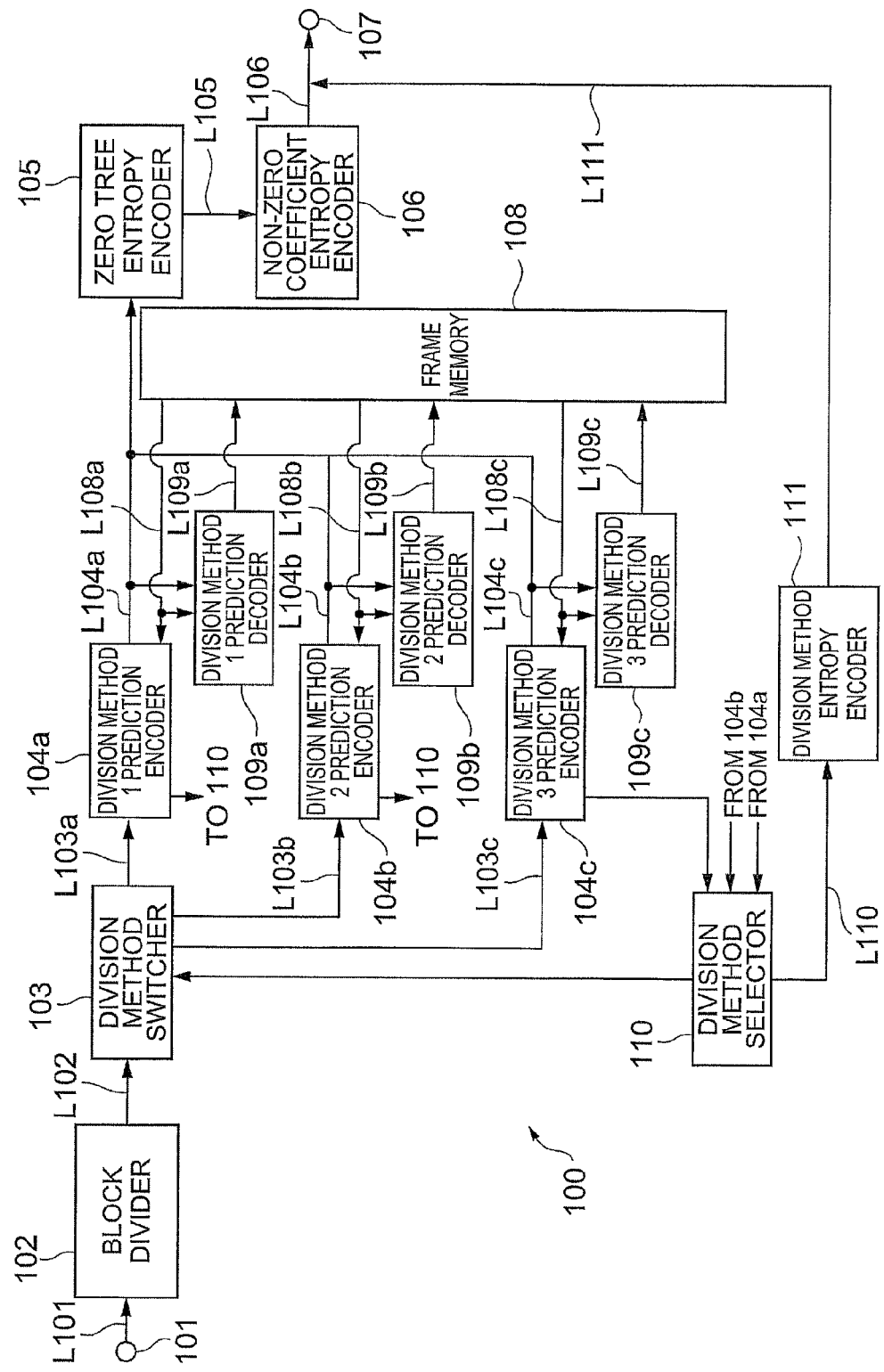
FIG. 1 is a block diagram illustrating a configuration of a picture encoding device according to an example embodiment.

Encoding methods may perform an encoding process after dividing the picture data to be encoded into a plurality of blocks, and generate a prediction signal in a target block to be encoded. Prediction methods for generating the prediction signal may include intra prediction performing prediction based on a decoded signal of an encoded region in the same frame and inter prediction performing prediction based on a decoded signal of a different frame encoded in the past.

An example of intra prediction may involve generating a prediction signal by extrapolating an already reproduced pixel value that is adjacent to a target block to be encoded in a predetermined direction.

On the other hand, an example of inter prediction may involve generation of a prediction signal by a method of searching for a signal that is similar to an original signal of a target block to be encoded from an already reproduced frame. Then, a motion vector that is a spatial displacement between a region that the searched signal configures and the target block is encoded.

In some example processes, a method of dividing a target block (for example, a 16×16 block) into small blocks having different block sizes (for example, 8×8, 8×16, 16×8, 8×4, 4×8, or 4×4 blocks in addition to a 16×16 block) and generating a prediction signal for each small block may be used in order to cope with the change of local features of a picture.

Then, a residual signal may be obtained by subtracting an original signal of a target block from the prediction signal of the target block, and frequency transform of the residual signal may be performed by discrete cosine transform or the like. In general, if the residual signal has no undulation in a transformed block, the transform efficiency becomes higher as the block size of the frequency transform becomes larger. However, a discontinuous signal may exist at a prediction block boundary, and if frequency transform is performed with respect to a large residual block to which the residual signal advances over the prediction block boundary is added, a high-frequency component may be increased, and thus the encoding efficiency may be degraded. Due to this, the frequency transform may be performed in the block unit that is equal to or smaller than a block when the prediction signal is generated.

Thereafter, frequency-transformed coefficients may be quantized and then may be entropy-encoded as quantized transform coefficients. The quantized transform coefficients of each block tend to include lots of "0" values, and this tendency may become stronger as the prediction efficiency becomes higher. One example method of efficiently encoding "0" value coefficients may be a zero tree encoding method. In general, this method performs mapping of a quantized transform coefficient in a block on a leaf of a tree structure (at the lower end of a tree structure), and updates the states (0 or 1) of a node of the tree structure (a branch point in the middle of the tree structure) and the leaf based on the coefficient value of the leaf. Then, the method encodes the state of the tree structure and non-zero quantized transform coefficient values. Accordingly, by mapping the quantized transform coefficients in the block on the leaf of the tree structure so that a node and a leaf, which are below any node in the tree structure, become "0" values, it becomes possible to encode the quantized transform coefficients of a "0" value by using a small amount of code.

Picture Encoding Device

FIG. 1 is a block diagram illustrating a configuration of a picture encoding device 100 included in an example embodiment of the image encoding and decoding device. The picture encoding device 100 may be a computing device or computer, including for example software, hardware, or a combination of hardware and software, as described later, capable of performing the described functionality. The picture encoding device 100 may be one or more separate systems or devices included in the image encoding and decoding device, or may be combined with other systems or devices within the image encoding and decoding device. In other examples, fewer or additional blocks may be used to illustrate the functionality of the picture encoding device 100. The picture encoding device 100 includes an input terminal 101, a block divider 102, a division method switcher 103, a division method 1 prediction encoder 104a, a division method 2 prediction encoder 104b, a division method 3 prediction encoder 104c, a zero tree entropy encoder 105, a non-zero coefficient entropy encoder 106, an output terminal 107, a frame memory 108, a division method 1 prediction decoder 109a, a division method 2 prediction decoder 109b, a division method 3 prediction decoder 109c, a division method selector 110, and a division method entropy encoder 111. Hereinafter, the division method 1 prediction encoder 104a, the division method 2 prediction encoder 104b, and the division method 3 prediction encoder 104c are collectively named as a "division method p prediction encoder 104". The division method 1 prediction decoder 109a, the division method 2 prediction decoder 109b, and the division method 3 prediction decoder 109c are collectively named as a "division method p prediction decoder 109".

Hereinafter, the operation of the picture encoding device 100 as configured above will be described. A moving picture signal that is composed of series of picture is input to the input terminal 101. The picture to be encoded is divided into a plurality of regions through the block divider 102, or region division unit. In this embodiment, as an example, the picture is divided into 8×8 pixel blocks. In other examples, the picture may be divided in other block sizes or shapes.

Next, the regions to be encoded (hereinafter referred to as "target blocks") are input to the division method switcher 103.

At the same time, the division method selector 110, or division method selector unit determines a division method of the target block from among a plurality of division methods, and outputs identification information of the determined division method to the division method switcher 103, or division method encoding unit. A method of selecting the division method will be described later (with reference to a flowchart of FIG. 10). Further, the division method selector 110 may output the identification information of the selected division method to the division method entropy encoder 111, or division method encoding unit. The division method entropy encoder 111 encodes the input identification information of the division method and outputs the encoded information to the output terminal 107. Although three division methods are exemplified hereinafter, the number of division methods of the target block is not so limited.

On the other hand, the division method switcher 103 outputs an original signal of the target block to the division method 1 prediction encoder 104a in the case where the division method selected from the three division methods through the division method selector 110 is the division method 1, to the division method 2 prediction encoder 104b in the case where the selected division method is the division method 2, and to the division method 3 prediction encoder 104c in the case where the selected division method is the division method 3, respectively.

Here, a case where the division method 1 is selected will be described as an example. The division method 1 prediction encoder 104a divides the input target block into small regions (hereinafter referred to as "sub-blocks"), generates a prediction signal for each sub-block, and performs frequency transform and quantization of a residual signal representative of a difference between the original signal of the respective sub-block and the prediction signal. Also, the division method 1 prediction encoder 104a performs mapping of quantized transform coefficients of the respective sub-blocks onto leaves of a predetermined tree structure, updates the state of the tree structure according to the coefficients of the respective leaves, and outputs the updated tree structure state to the zero tree entropy encoder 105, or zero tree encoding unit (the details thereof will be described later). A common tree structure that does not depend on the division method of the target block may be used as the tree structure. In other examples, the tree structure may be common to at least two of the division methods. The division method 1 prediction encoder 104a may also output states of the nodes and leaves of the tree structure and non-zero quantized transform coefficients of the respective sub-blocks to the division method 1 prediction decoder 109a for a local decoding process.

The division method 2 prediction encoder 104b and the division method 3 prediction encoder 104c may operate in a similar manner as the division method 1 prediction encoder 104a. The details of the division method p prediction encoder 104 will be described later with reference to FIG. 2. The term "module" or "unit" is defined to include one or more executable parts of the image encoding and decoding device. As described herein, the modules and/or units are defined to include software, hardware or some combination thereof executable by a processor (described later). Software included in the modules and/or units may include instructions stored in memory, or any other computer readable storage medium, that are executable by the processor, or any other processor. Hardware included in the modules and/or units may include various devices, components, circuits, gates, circuit boards, and the like that are executable, directed, and/or controlled for performance by the processor.

The block size and the block shape of the respective sub-blocks are not limited.

Tree Structure and Zero Tree Encoding

Examples of the tree structure, sub-block division, and zero tree encoding will be described. A common tree structure may be classified into at least two kinds. For example, a first tree structure may be a tree structure that includes all quantized transform coefficients in the target block. A second tree structure may be a tree structure that includes only quantized transform coefficients of a sub-block having a predetermined number of pixels. In other examples, other tree structures may be used.

The first tree structure is independent of does not depend on the division method of the target block, and thus can be applied to any sub-block. An example of the first tree structure will be described later, and an example of the second tree structure will now be described.

In a case where the second tree structure is used, the target block may divided into sub-blocks having the same number of pixels regardless of the division method, and a tree structure based on the number of pixels may used. In this example embodiment the target block may be composed of a predetermined pixel matrix or pixel block, such as 8×8 pixels, and a method of dividing the target block into a determined number of sub-blocks, such as four sub blocks, each of which is composed of 16 pixels, will be described as an example. In this example, it is assumed that the three division methods correspond to 4×4 pixels (a sub-block 61 in FIG. 6), 2×8 pixels (a sub-block 71 in FIG. 7), and 8×2 pixels (a sub-block 81 in FIG. 8), respectively, and a tree structure that appears as a tree 62 of FIG. 6 (the tree 72 in FIG. 7 and the tree 82 in FIG. 8 may have a similar structure) is used.

Figure 6:
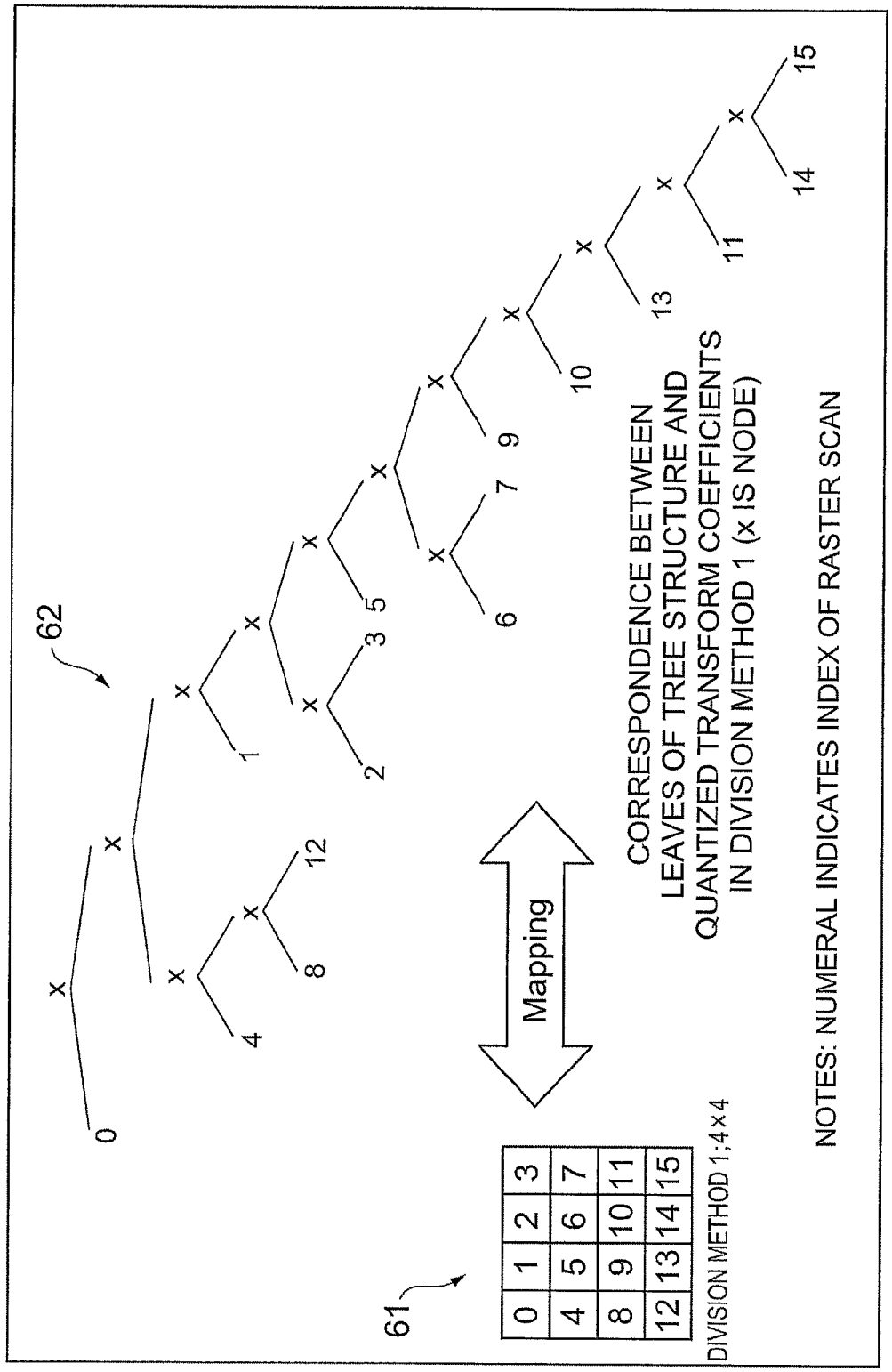
FIG. 6 is a first schematic diagram illustrating an example mapping process of quantized transform coefficients onto a tree structure.

Referring to the example tree structure of FIG. 6, a junction that is indicated by a mark x is called a "node", and a lower end of the tree that is indicated by a numeral is called a "leaf". The state of the node or the leaf is indicated by a determined value, such as "0" or "1", and each node state is determined according to the state of the node or leaf at two branch ends of the node. With respect to a certain node (target node) that is indicated by x, if the states of two nodes (or leaves) at the branch ends are "0", for example, the state of the target node becomes "0", while if any one or both of the states of two nodes (or leaves) at the branch ends are "1", for example, the state of the target node becomes "1".

In the example of FIG. 6, the numerals of a sub-block 61 indicate the positions of the respective quantized transform coefficients in the sub-block, and correspond to the numerals of a tree 62 of the tree structure. The respective quantized transform coefficients of the sub-block 61 are mapped on leaves, which have the same numbers as the quantized transform coefficients, of the tree 62 of the tree structure. If the mapped quantized transform coefficients are non-zero, the state of the respective leaves becomes "1", while if the mapped quantized transform coefficients are zero, the state of the leaves becomes "0". Once the state of the leaves is determined, the states of the nodes of the mark x are determined in an order, such as from the right lower side to the left upper side of the tree structure. Accordingly, in the case where the state of x is "0", the values of the quantized transform coefficients, which correspond to the leaves of the tree originating from the corresponding node, are all "0".

In zero tree encoding, the states of the nodes and the leaves of the tree structure are encoded in a predetermined procedure (for example, searching for the mark x in order from the left upper side to the right lower side of the tree structure). In this case, if the state of a certain node is "0", the states of the nodes and the leaves that originate from the node are all "0", and thus it is not required to encode the states of the nodes and the leaves. Accordingly, a map that indicates the correspondence between the leaves of the tree structure and the quantized transform coefficients is determined so that zero coefficients of the quantized transform coefficients are efficiently encoded with a small amount of code.

Figure 7:
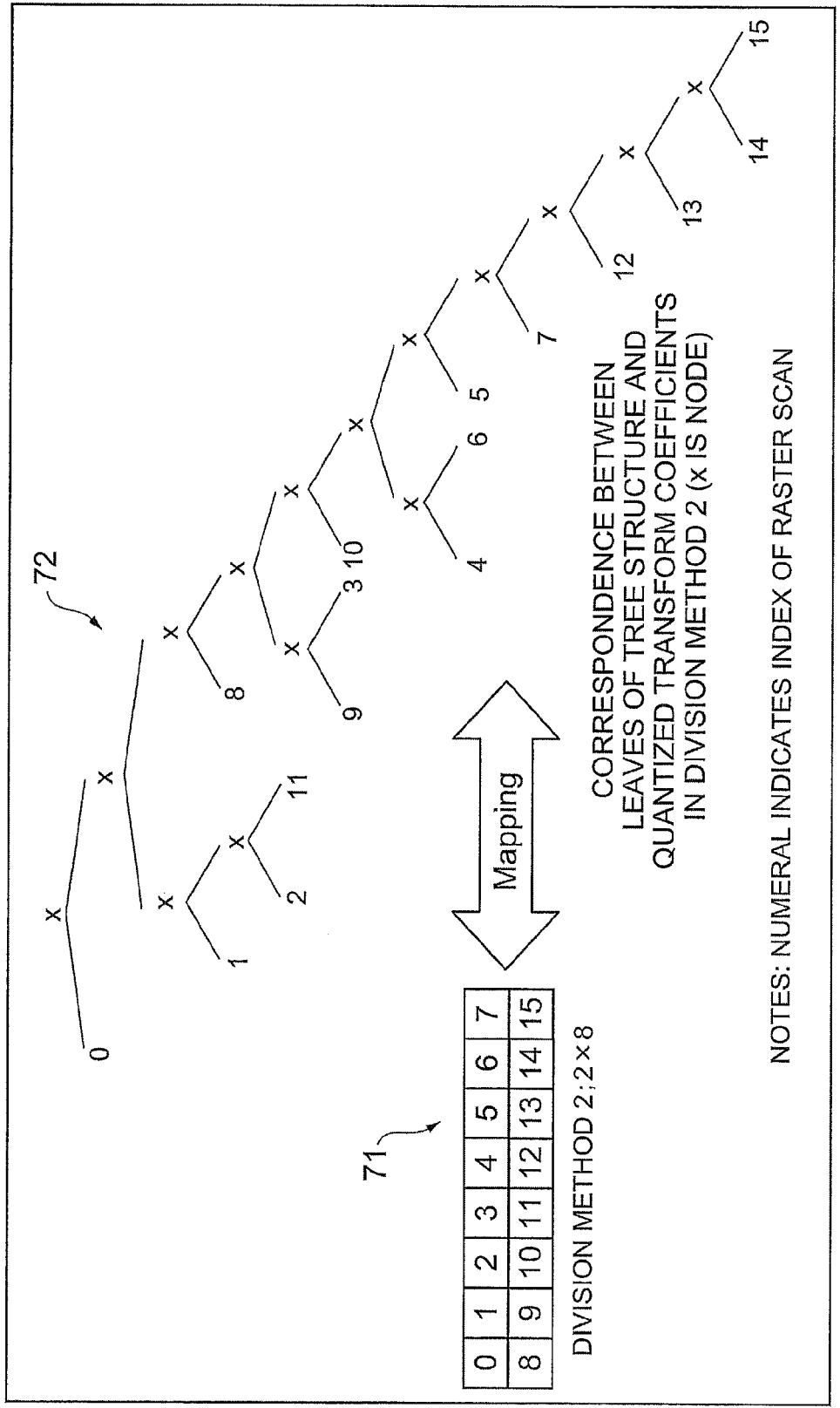
FIG. 7 is a second schematic diagram illustrating an example mapping process of quantized transform coefficients onto a tree structure.
Figure 8:
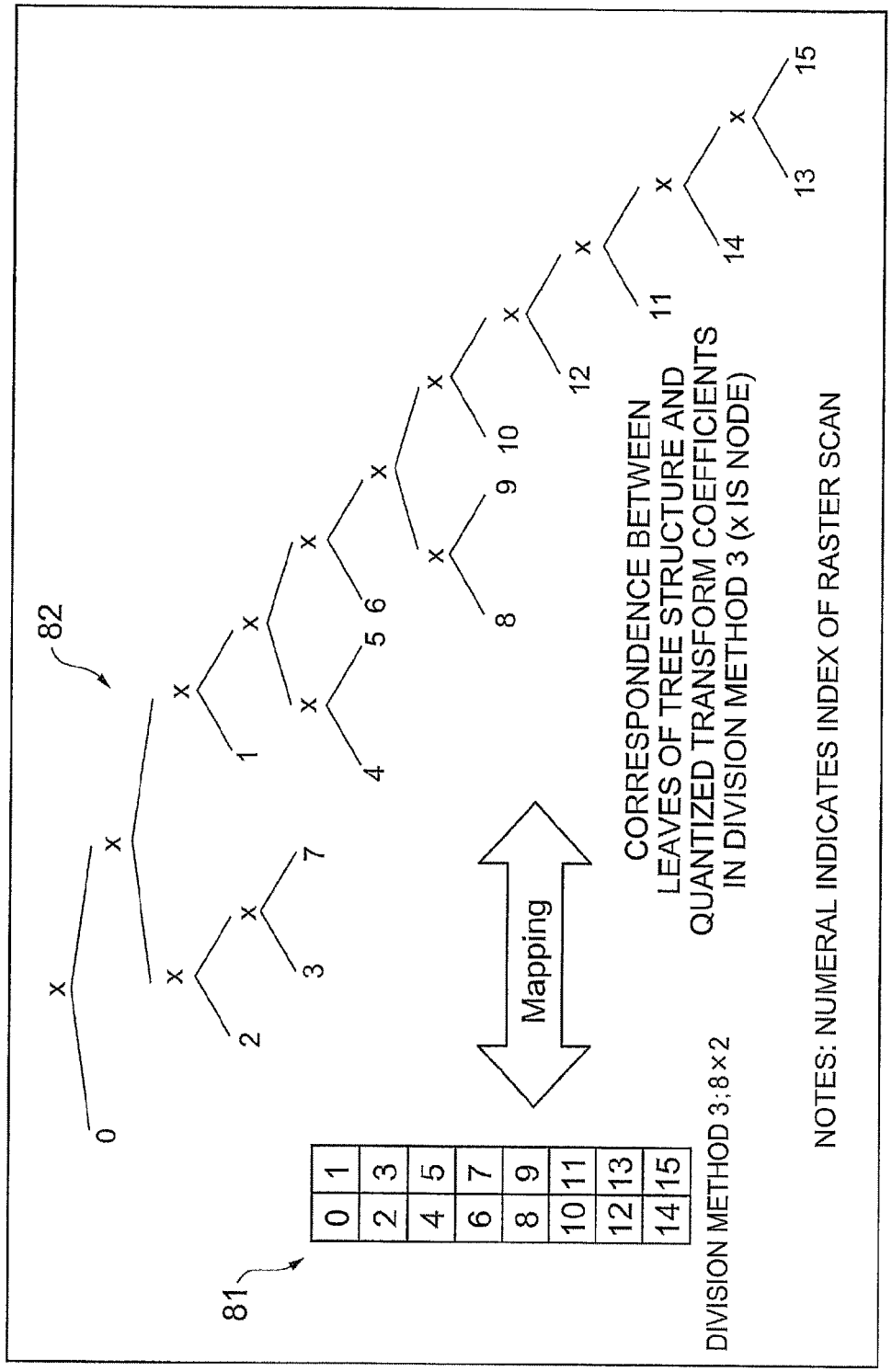
FIG. 8 is a third schematic diagram illustrating an example mapping process of quantized transform coefficients onto a tree structure.

The tree structure may be common to the respective division methods. In other examples, the tree structure may be common to at least two respective division methods. Based on the probability that at least some of the respective quantized transform coefficients in the sub-block are zero values, a rule for mapping the quantized transform coefficients onto the respective leaves may be individually determined with respect to the respective division methods. Here, rules allocating the quantized transform coefficients in the sub-block to the leaves of the tree structure as shown in FIGS. 6, 7, and 8 may each be called a "map", and a process of allocating the quantized transform coefficients in the sub-block to the leaves of the tree structure may be called "mapping".

Referring again to FIG. 1, the zero tree entropy encoder 105, or zero tree entropy encoder unit may perform entropy encoding of the input states of the nodes and the leaves using a common probability mode that may be independent of the division method of the target block. Also, the zero tree entropy encoder 105 may output the encoded data of the states of the nodes and the leaves in the target block and the values of the non-zero quantized transform coefficients to the non-zero coefficient entropy encoder 106.

In one example, the probability model may be obtained by setting a probability that one node becomes a predetermined value, such as a "0" (or "1") with respect to the respective nodes and leaves, and the probability model may determine the code that is output when the state of the node or the leaf is encoded. In this case, if the probability model is predetermined, the same probability model can be used in encoding the states of the plurality of nodes and leaves. Also, in the case of an arithmetic code, the probability mode of the respective nodes or leaves may be updated based on the generated code.

The non-zero coefficient entropy encoder 106, or non-zero coefficient entropy encoder unit, may encode the non-zero quantized transform coefficients in the sub-block of the input target block in a predetermined procedure (for example, a raster scan order), and output the obtained encoded data to the output terminal 107 together with the encoded data of the states of the nodes and the leaves. The entropy encoding method may be an arithmetic encoding method, a variable length encoding method, or any other encoding method.

The division method 1 prediction decoder 109*a* may restore the quantized transform coefficients of the respective sub-blocks from decoded values of the states of the nodes and the leaves of the input tree structure and the non-zero quantized transform coefficients of the respective sub-blocks. The quantized transform coefficients of the respective sub-blocks may be inverse-quantized and inverse-transformed to generate a reproduction residual signal. In addition, the division method 1 prediction decoder 109*a* may generate prediction signals of the respective sub-blocks similar to the division method 1 prediction encoder 104*a*. Lastly, the reproduction residual signal of each sub-block and the prediction signal may be added to restore a reproduction signal. The division method 2 prediction decoder 109b and the division method 3 prediction decoder 109c may operate similar to the division method 1 prediction decoder 109a as described above. The details of the division method p prediction decoder 109 will be described later with reference to FIG. 4.

The restored reproduction signal may be output to the frame memory 108 and may be stored as a picture, such as a reference picture that is used for a prediction process.

In the case where the prediction method in the division method p prediction encoder 104 does not refer to the picture signal stored in the frame memory 108, the division method p prediction decoder 109 is unnecessary, and may be omitted.

Division Method p Prediction Encoder 104

Figure 2:
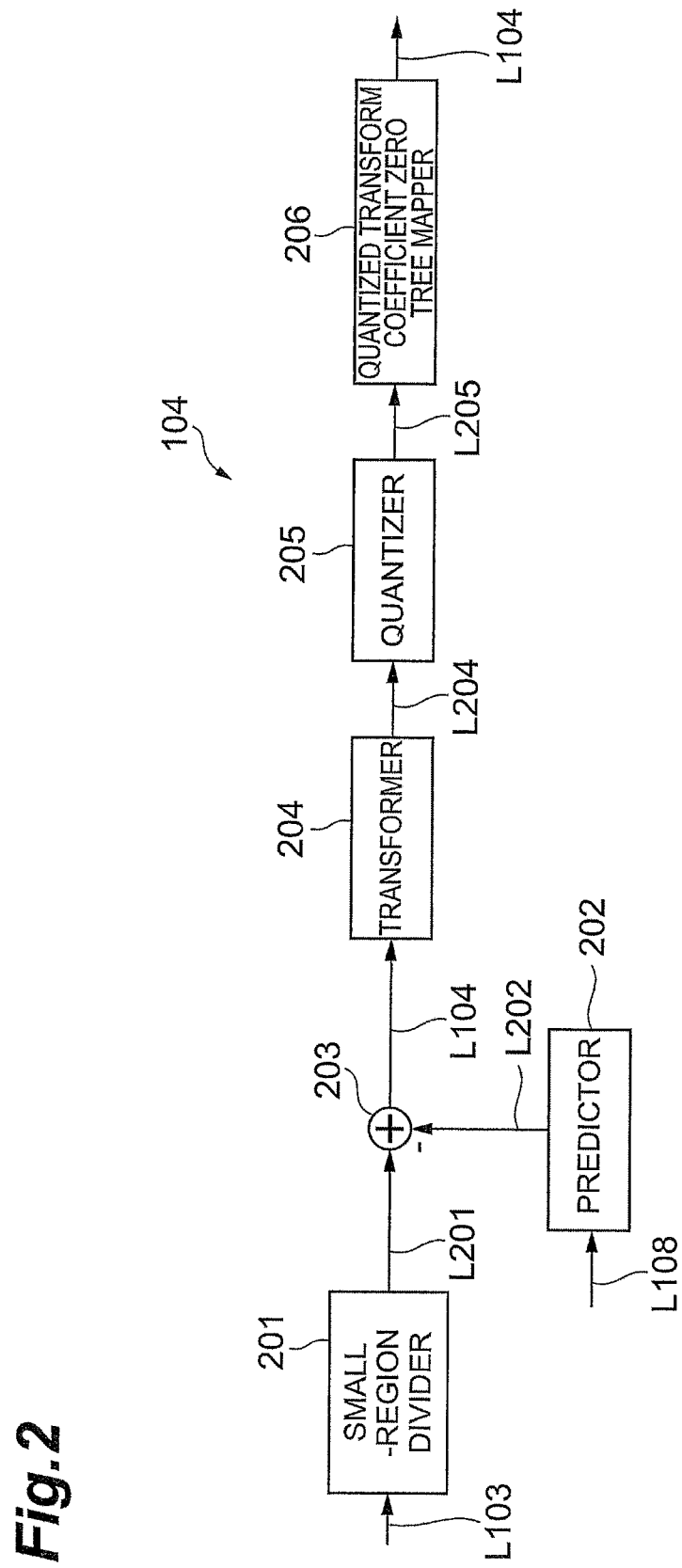
FIG. 2 is a block diagram illustrating a configuration of an example embodiment of a prediction encoder that is installed for each division method.

The division method p prediction encoder 104, or the division method p prediction encoder unit (the division method 1 prediction encoder 104a, the division method 2 prediction encoder 104b, and the division method 3 prediction encoder 104c) may include a common configuration as illustrated in FIG. 2. Hereinafter, the configuration of the division method p prediction encoder 104 will be described. As illustrated in FIG. 2, the division method p prediction encoder 104 may include a small-region divider 201, a predictor 202, a subtractor 203, a transformer 204, a quantizer 205, and a quantized transform coefficient zero tree mapper 206.

The small-region divider 201, or small region division unit, may divide the input target block into sub-blocks according to a selected division method p, and may output the sub-blocks to the subtractor 203.

The predictor 202, or prediction unit, generates a prediction signal of each sub-block and outputs the prediction signal to the subtractor 203 based on one of a plurality of prediction methods. In one example, the prediction methods include inter prediction and intra prediction. In the inter prediction, a reproduced picture which was encoded in the past and then has been restored may be considered as a reference picture, and motion information that provides a prediction signal having the smallest error (or differences) with respect to the sub-block may be obtained from the corresponding reference picture. On the other hand, in the intra prediction, an intra prediction signal may be generated by a copy process (copy process into each pixel position in the sub-block) based on a predetermined method, such as a method that uses an already reproduced pixel value spatially adjacent to the sub-block. The prediction signal generation method is not limited. A plurality of prediction methods may be prepared and used with respect to the respective division methods, a prediction method may be selected for each target block or sub-block from the plurality of prediction methods, and information of the selected prediction method may be encoded. On the other hand, prediction methods may be predetermined with respect to the respective division methods, or prediction methods may be predetermined with respect to the positions of the respective sub-blocks in the target block.

The subtractor 203, or residual signal generation unit, may generate a residual signal for each sub-block by calculating a difference between the picture signal of each input sub-block and the prediction signal. The subtractor 203 may output the residual signal to the transformer 204, or transform unit.

The residual signal for each sub-block may be transformed, such as discrete-cosine-transformed, or frequency transformed, by the transformer 204, and the transform coefficient of each sub-block after the transformation may be output to the quantizer 205, or quantization unit.

The quantizer 205 may generate the quantized transform coefficient by quantizing the transform coefficient of each sub-block, and outputting the generated quantized transform coefficients to the quantized transform coefficient zero tree mapper 206, or zero tree mapping unit.

The quantized transform coefficient zero tree mapper 206 may perform mapping of the quantized transform coefficients of the respective sub-blocks onto the leaves of the common tree structure that does not depend on the division method of the target block, and update the states of the nodes and the leaves of the tree structure according to the coefficient values of the respective leaves (the details thereof will be described later). Also, the quantized transform coefficient zero tree mapper 206 may output the states of the nodes and the leaves of the tree structure for the respective sub blocks and the quantized transform coefficients that correspond to the leaves of which the state is non-zero, such as "1" to the zero tree entropy encoder 105.

In FIG. 1, the division method p prediction encoder 104 may independently operable with respect to the division methods 1, 2, and 3. However, in the case where the small-region divider 201, the predictor 202, the subtractor 203, the transformer 204, the quantizer 205, and the quantized transform coefficient zero tree mapper 206 as illustrated in FIG. 2 include functions that are common to the division methods 1 to 3 respectively, and also include functions to switch between the division methods, the division method 1 prediction encoder 104a, the division method 2 prediction encoder 104b, and the division method 3 prediction encoder 104c in FIG. 1 can be replaced by a single division method p prediction encoder 104. For example, the division method 1 prediction encoder 104a may perform the function of the three division method p prediction encoders 104, and identification information of the division method may be input from the division method selector 110 to the division method 1 prediction encoder 104a. In this case, the division method 2 prediction encoder 104b and the division method 3 prediction encoder 104c are unnecessary and may be omitted.

Figure 3:
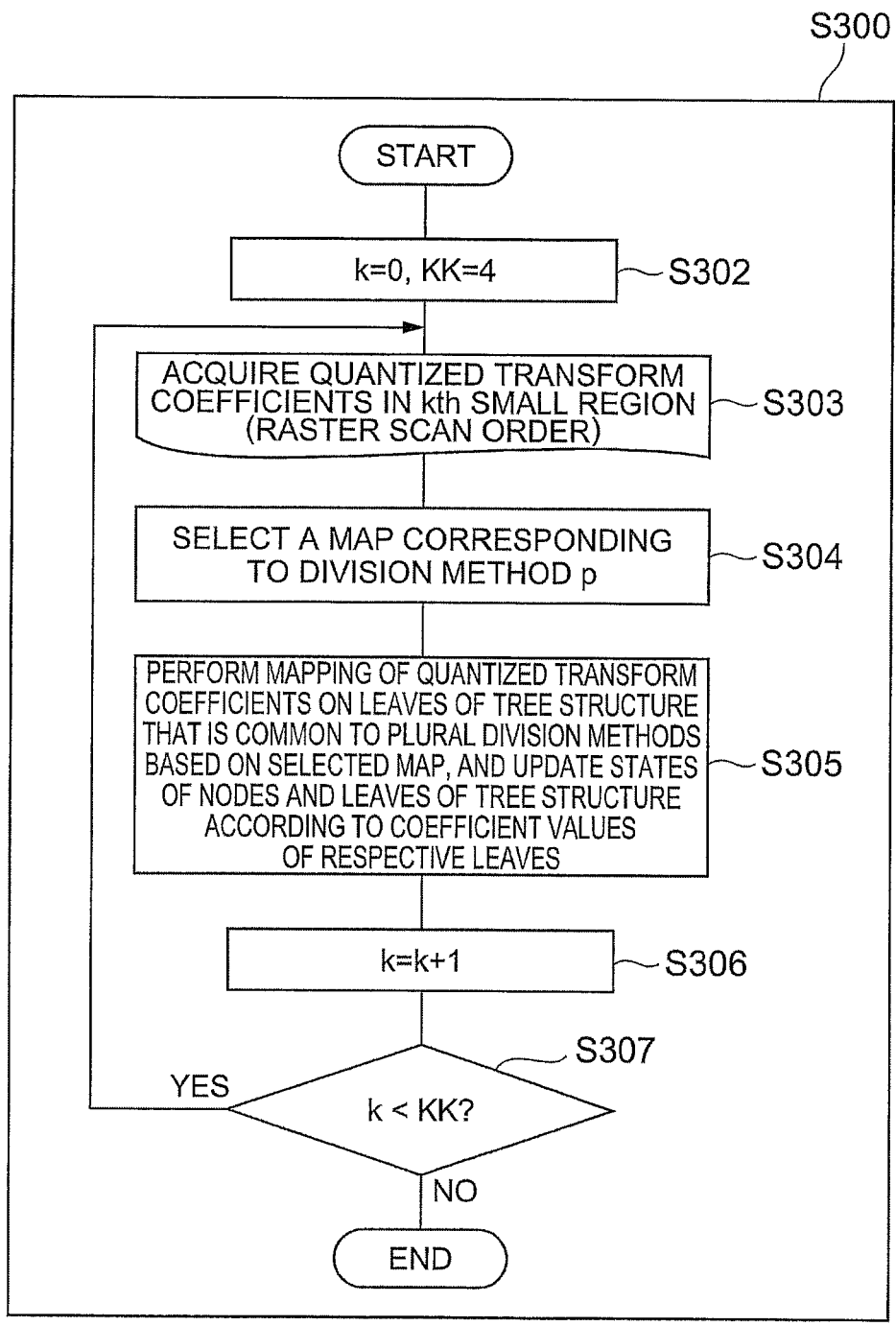
FIG. 3 is a first flowchart illustrating an example mapping process of quantized transform coefficients onto a tree structure.

FIG. 3 is an example of the zero and non-zero coefficient generation process that is performed by the quantized transform coefficient zero tree mapper 206 of FIG. 2.

The quantized transform coefficient zero tree mapper 206 initially sets a value of k (identification number of the sub-block) to "0" and a value of KK (the number of sub-blocks in the target block) to "4" in S302, and acquires the quantized transform coefficients in the $k^{th}$ (initially, $0^{th}$) sub-block in a scan order, such as a raster scan order in S303. The quantized transform coefficient zero tree mapper 206 may select a map, such as at least one map, that corresponds to the division method p (p may be a value, such as a value of 1 to 3; the division method 1 indicates a pixel matrix such as the 4×4 pixel block illustrated in the example of FIG. 6, the division method 2 indicates a pixel matrix, such as the 2×8 pixel block illustrated in the example of FIG. 7, and the division method 3 indicates a pixel matrix, such as a 8×2 pixel block illustrated in the example of FIG. 8) of the target block in S304. Next, in 5305, the quantized transform coefficient zero tree mapper 206 may perform mapping of the quantized transform coefficients onto the leaves of the tree structure that is common to the plurality of division methods based on the selected map (a tree 62 in FIG. 6, a tree 72 in FIG. 7, and a tree 82 in FIG. 8 represent example maps), may determine the states of the respective leaves as such as "0" (in the case where the coefficient value is "0") or "1" (in the case where the coefficient value is a non-zero value, such as a value, other than "0") according to the coefficient values of the respective leaves, and may update the states of the respective nodes according to the determined states of the respective nodes.

Next, the quantized transform coefficient zero tree mapper 206 may perform the processes in S303 to S305 with respect to the $k^{th}$ (here, $1^{st}$) sub-block by increasing the value of k by one in S306. Thereafter, the processes in S303 to S306 are repeatedly performed until the processes with respect to four sub-blocks are completed (S307).

As described above, even in the case of generating the prediction signal by dividing the target block with different division methods, the quantized transform coefficients can be mapped onto the leaves of the common tree structure, and thus it is not necessary to prepare a plurality of tree structures. Also, it becomes possible to perform zero tree encoding with a common probability model that does not depend on the division method of the target block.

Although in this embodiment, three division methods of the target block are used for 4×4, 2×8, and 8×2 pixels, the kind and the number of division methods are not limited except for the fixed number of pixels in the sub-block.

Division Method p Prediction Decoder 109

Figure 4:
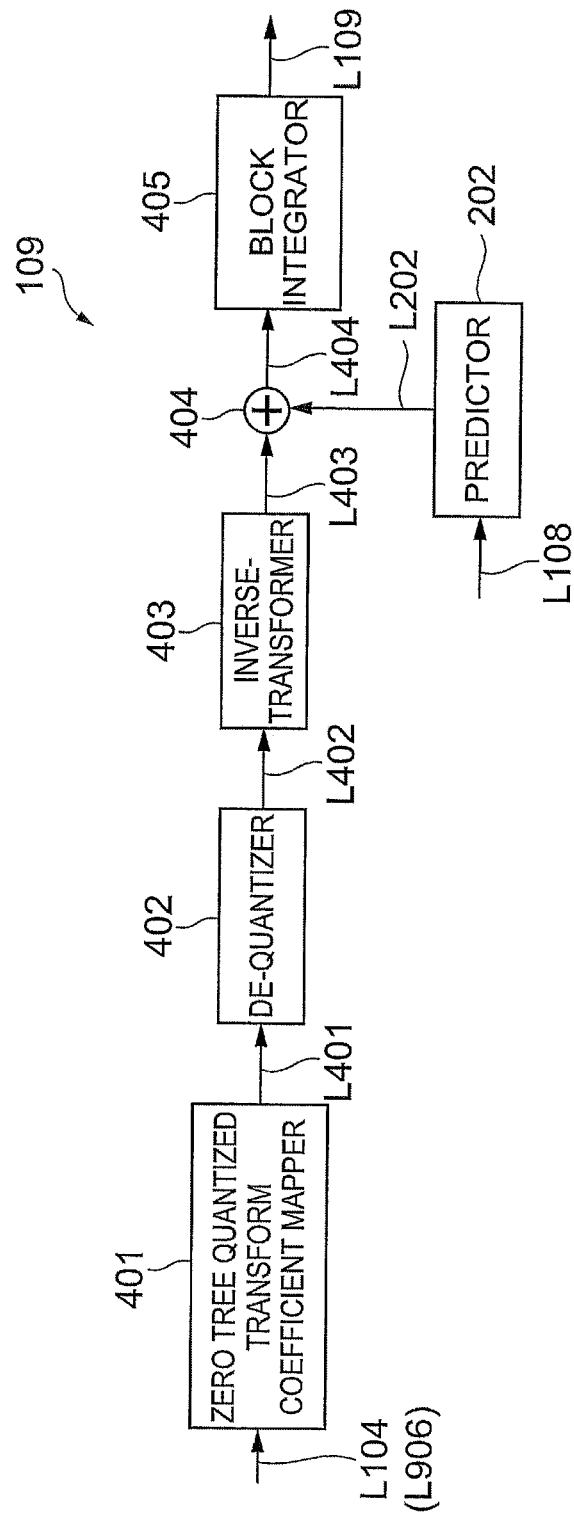
FIG. 4 is a block diagram illustrating an example embodiment of a configuration of a prediction decoder that is installed for each division method.

The division method p prediction decoder 109 (the division method 1 prediction decoder 109a, the division method 2 prediction decoder 109b, and the division method 3 prediction decoder 109c) includes a common configuration as illustrated in the example of FIG. 4. Hereinafter, the configuration of the division method p prediction decoder 109 will be described. As illustrated in FIG. 4, the division method p prediction decoder 109, or division method p prediction decoder unit may include a zero tree quantized transform coefficient mapper 401, a de-quantizer 402, an inverse-transformer 403, a predictor 202, an adder 404, and a block integrator 405. In this case, the predictor 202 of FIG. 4 may be similar as that of FIG. 2 as described above.

The zero tree quantized transform coefficient mapper 401 receives an input of the decoded values of the states of the node and the leaves of the common tree structure that does not depend on the division method of the target block and the quantized transform coefficients of the leaves having a non-zero state, such as the state of "1" (that is, non-zero quantized transform coefficients) with respect to the respective sub-blocks. The zero tree quantized transform coefficient mapper 401 may restore the quantized transform coefficients of the respective sub-blocks from the decoded values of the states of the nodes and leaves of the input tree structure and the non-zero quantized coefficients (the details thereof will be described later), and output the restored quantized transform coefficients to the de-quantizer 402.

The de-quantizer 402, or de-quantization unit, may perform de-quantization of the quantized transform coefficients of the respective sub-blocks to restore the transform coefficients, and may output the restored transform coefficients to the inverse-transformer 403.

The inverse-transformer 403, or inverse-transform unit, may perform inverse-transformation of the transform coefficients of the respective sub-blocks to restore the residual signals, and output the restored residual signals to the adder 404.

The predictor 202, in a similar manner as the predictor 202 in the prediction encoder 104 of FIG. 2 as described above, may generate prediction signals for pixel signals of the respective sub-blocks, and output the prediction signals to the adder 404.

The adder 404, or picture restoration unit may add the prediction signals to the restored residual signals of the respective sub-blocks to restore reproduction signals of the respective sub-blocks, and output the restored reproduction signals to the block integrator 405.

The block integrator 405 may integrate the reproduction signals of the respective sub-blocks according to the division method p to restore the reproduction signal of the target block.

In FIG. 1, the division method p prediction decoder 109 is illustrated as independent for each of the division methods 1, 2, and 3. However, in the case where the zero tree quantized transform coefficient mapper 401, the de-quantizer 402, the inverse-transformer 403, the predictor 202, the adder 404, and the block integrator 405 as illustrated in FIG. 4 include functions common with the division methods 1 to 3 respectively, and include functions to switch the process by the division methods, the division method 1 prediction decoder 109a, the division method 2 prediction decoder 109b, and the division method 3 prediction decoder 109c in FIG. 1 can be replaced by a single division method p prediction decoder 109. For example, the division method 1 prediction decoder 109a may perform the function of the three division method p prediction decoders 109, and identification information of the division method is input from the division method selector 110 to the division method 1 prediction decoder 109a. In this case, the division method 2 prediction decoder 109b and the division method 3 prediction decoder 109c are unnecessary and may be omitted.

Figure 5:
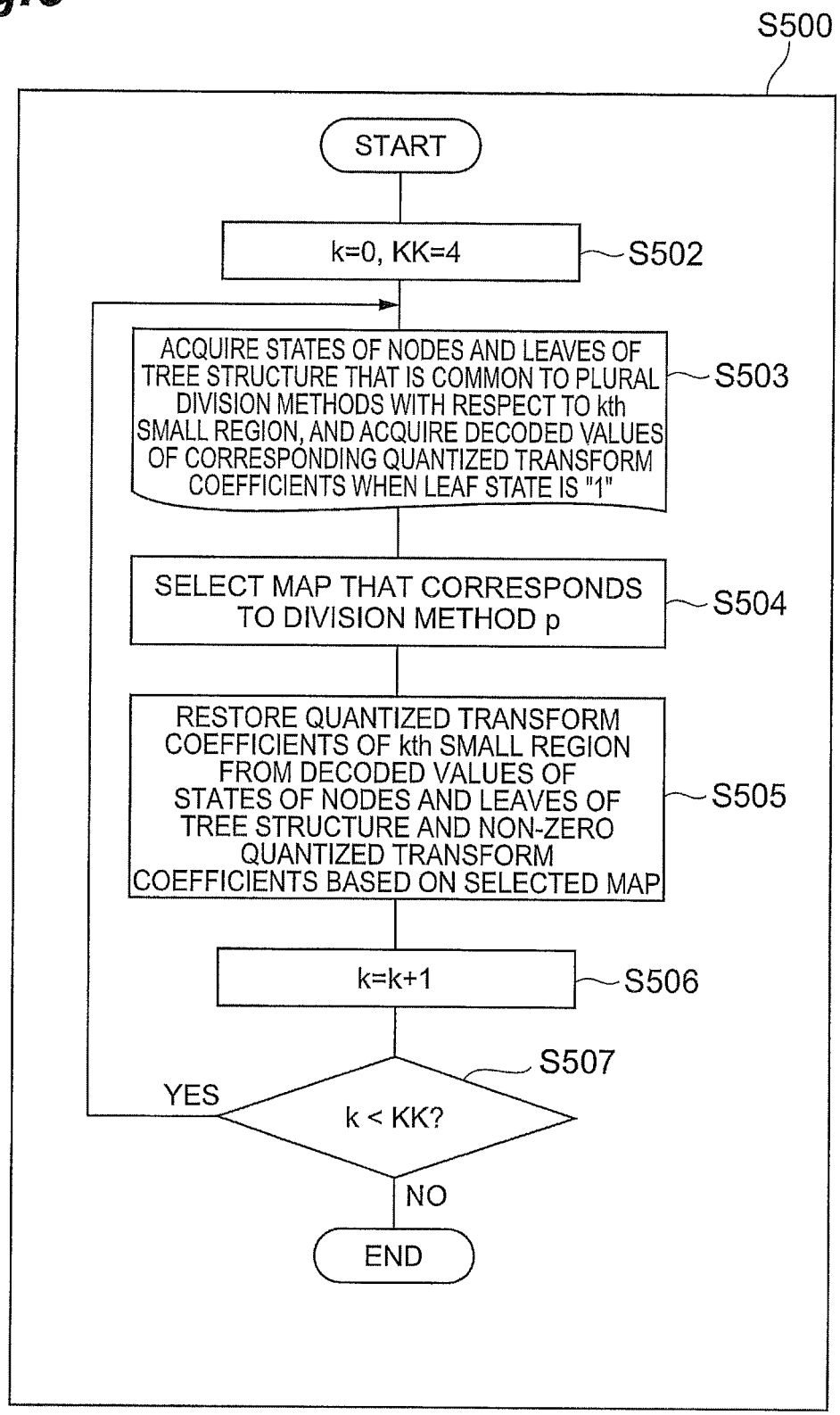
FIG. 5 is a first flowchart illustrating an example mapping process of a tree structure onto quantized transform coefficients.

FIG. 5 is an example of a restoring process of the quantized transform coefficients that is performed by the zero tree quantized transform coefficient mapper 401 of FIG. 4.

The zero tree quantized transform coefficient mapper 401 may initially set a value of k (identification number of the sub-block) to a first determined value, such as "0", and a value of KK (the number of sub-blocks in the target block) to a second determined value, such as "4" in S502. The zero tree quantized transform coefficient mapper 401 may then acquire the states of the nodes and leaves of the decoded tree structure with respect to the $k^{th}$ (initially, $0^{th}$) sub-block and acquire the decoded values of the quantized transform coefficients that correspond to the leaves of which the state is "1" (non-zero quantized transform coefficients) in the next S503.

The zero tree quantized transform coefficient mapper 401 may select a map, such as at least one map, that corresponds to the division method p (for example, where p is a value of 1 to 3; the division method 1 may indicate the 4×4 pixel block in FIG. 6, the division method 2 may indicate the 2×8 pixel block in FIG. 7, and the division method 3 may indicate the 8×2 pixel block in FIG. 8) of the target block in S504. Next, in S505, the zero tree quantized transform coefficient mapper 401 may restore the quantized transform coefficients of the $k^{th}$ (initially $0^{th}$) sub-block from the decoded values of the states of the nodes and leaves of the tree structure and the quantized transform coefficients that correspond to the leaves of which the state is "1", based on the selected map (a tree 62 in FIG. 6, a tree 72 in FIG. 7, and a tree 82 in FIG. 8).

Next, the zero tree quantized transform coefficient mapper 401 may repeatedly perform the processes in S503 to S505 with respect to the $k^{th}$ (here, $1^{st}$) sub-block by increasing the value of k by one in S506. Thereafter, the processes in S503 to S506 are repeatedly performed until the processes with respect to four sub-blocks are completed (S507).

Picture Decoding Device

Figure 9:
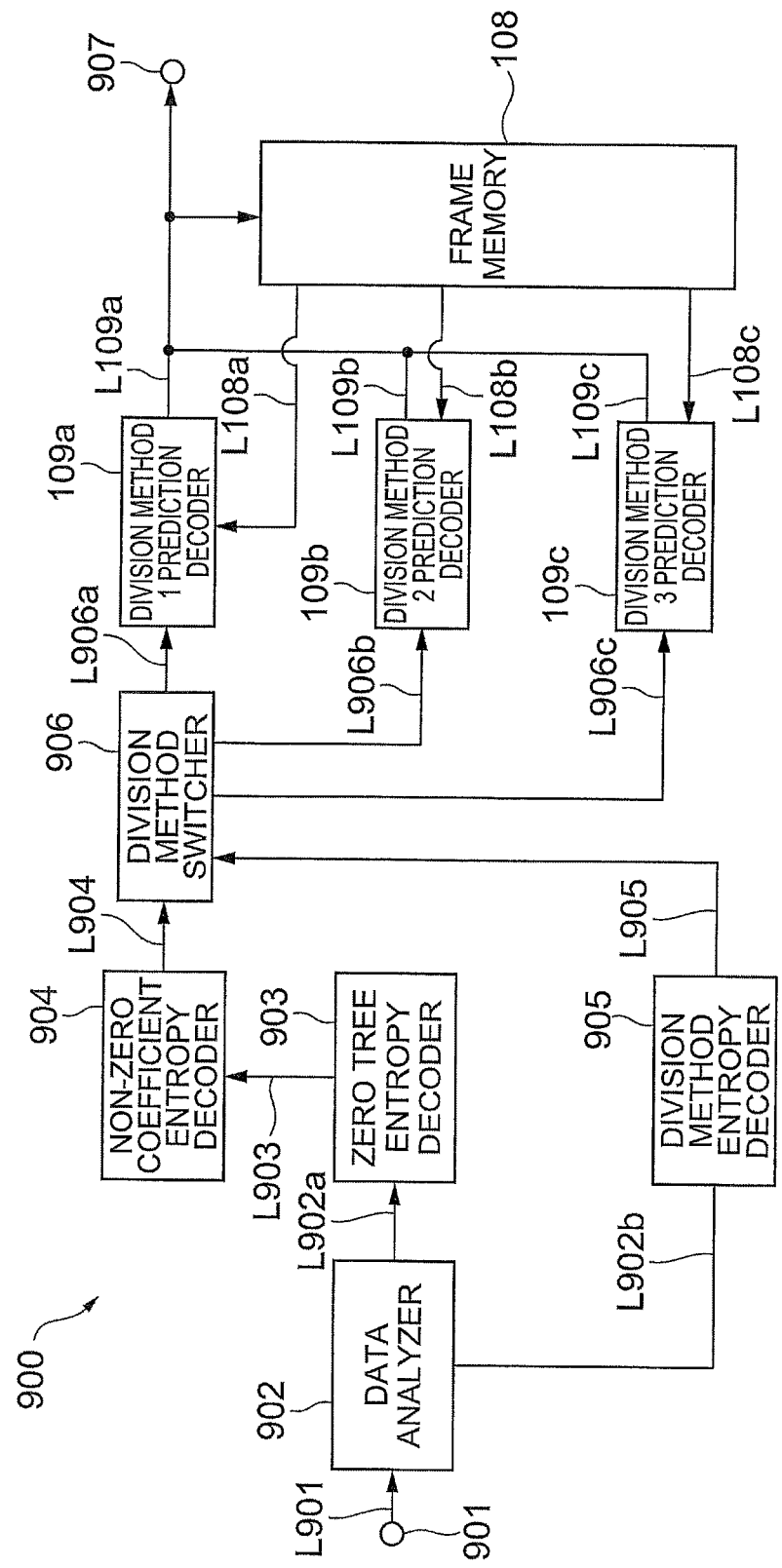
FIG. 9 is a block diagram illustrating a configuration of a picture decoding device according to an example embodiment.

FIG. 9 is a block diagram illustrating a configuration of a picture decoding device 900 according to an example embodiment of the encoding and decoding device. The picture decoding device 900 may include an input terminal 901, a data analyzer 902, a zero tree entropy decoder 903, a non-zero coefficient entropy decoder 904, a division method entropy decoder 905, a division method switcher 906, and an output terminal 907. A frame memory 108 of FIG. 9 is similar to the frame memory 108 of FIG. 1 as described above, and a division method p prediction decoder 109 of FIG. 9 is similar to the division method p prediction decoder 109 of FIG. 1 as described above.

Hereinafter, the operation of the picture decoding device 900 as configured above will be described. When an encoded bitstream is input to the input terminal 901, the data analyzer 902, or data analysis unit, may extract encoded data from the bitstream, which is used to decode the target block to be processed. Also, the data analyzer 902 may divide the acquired encoded data into encoded data of the residual signal (that is, encoded data obtained by performing the zero tree encoding of the states of the nodes and leaves of the tree structure and encoded data of the non-zero quantized transform coefficients) and encoded data of information for identifying the division method, and may output the encoded data of the residual signal to the zero tree entropy decoder 903 and outputs the encoded data of the identification information of the division method to the division method entropy decoder 905.

The division method entropy decoder 905, or division method decoding unit, may decode the input encoded data of the identification information of the division method, and restores the identification information of the sub-block division method in the target block. The restored identification information may be output to the division method switcher 906.

On the other hand, the zero tree entropy decoder 903, or zero tree decoding unit, may perform the entropy decoding of the states of the nodes and leaves of the tree structure of the respective sub-blocks in the target block using a model, such as a common probability model that does not depend on the division method of the target block. Also, the zero tree entropy decoder 903 may output the encoded data of the decoded states of the nodes and leaves of the tree structure and the decoded values that correspond to the quantized transform coefficients (non-zero quantized transform coefficients) indicating that the decoded state of the leaves is "1", to the non-zero coefficient entropy decoder 904, or non-zero coefficient decoding unit.

The non-zero coefficient entropy decoder 904 may perform entropy decoding of the input encoded data of the non-zero quantized transform coefficients to restore the quantized transform coefficient values. The restored decoded values of the non-zero quantized transform coefficients and the input states of the nodes and leaves of the tree structure may be output to the division method switcher 906.

The division method switcher 906 outputs the decoded values of the states of the nodes and leaves of the tree structure and the non-zero quantized transform coefficients of the respective sub-blocks to any one of the three division method p prediction decoders 109, or division method p prediction decoder units, based on the identification information of the division method.

For example, in the case where the division method 1 is decoded as the identification information of the division method, the decoded values of the states of the nodes and leaves of the tree structure and the non-zero quantized transform coefficients of the respective sub-blocks are output to the division method 1 prediction decoder 109a, and the division method 1 prediction decoder 109a may restore the quantized transform coefficients of the respective sub-blocks from the decoded values of the input states of the nodes and leaves of the tree structure and the non-zero quantized transform coefficients of the respective sub-blocks. Also, the division method 1 prediction decoder 109a may perform the de-quantization and the inverse-transform of the quantized transform coefficients of the respective sub-blocks to generate a reproduction residual signal. In addition, the division method 1 prediction decoder 109a may generate prediction signals of the respective sub-blocks in a similar manner as the division method 1 prediction encoder 104a of FIG. 1. Lastly, the division method 1 prediction decoder 109a may add the reproduction residual signal of the respective sub-blocks and the prediction signals to restore the reproduction signal. The restored reproduction signal may be output to the frame memory 108, and stored as a picture, such as a reference picture that is used for the prediction process.

Since the operation of the division method p prediction decoder 109 of FIG. 9 has already been described with reference to FIGS. 4 and 5, the explanation thereof will be omitted. In FIG. 9, the division method p prediction decoder 109 is illustrated as independent units for each of the division methods 1, 2, and 3. However, in the case where the zero tree quantized transform coefficient mapper 401 or zero tree quantized transform coefficient mapping unit, the de-quantizer 402 or de-quantization unit, the inverse-transformer 403 or inverse-transform unit, the predictor 202 or prediction unit, the adder 404 or picture restoration unit, and the block integrator 405 as illustrated in the example embodiment of FIG. 4 include functions of the division methods 1 to 3 respectively, and have functions of switching the division methods, the division method 1 prediction decoder 109a, the division method 2 prediction decoder 109b, and the division method 3 prediction decoder 109c in FIG. 9 can be replaced by a single division method p prediction decoder 109. For example, the division method 1 prediction decoder 109a may perform the function of the three division method p prediction decoders 109, and identification information of the division method may be input from the division method entropy decoder 905 to the division method 1 prediction decoder 109a. In this case, the division method 2 prediction decoder 109b and the division method 3 prediction decoder 109c are unnecessary and may be omitted.

Picture Encoding Method

Figure 10:
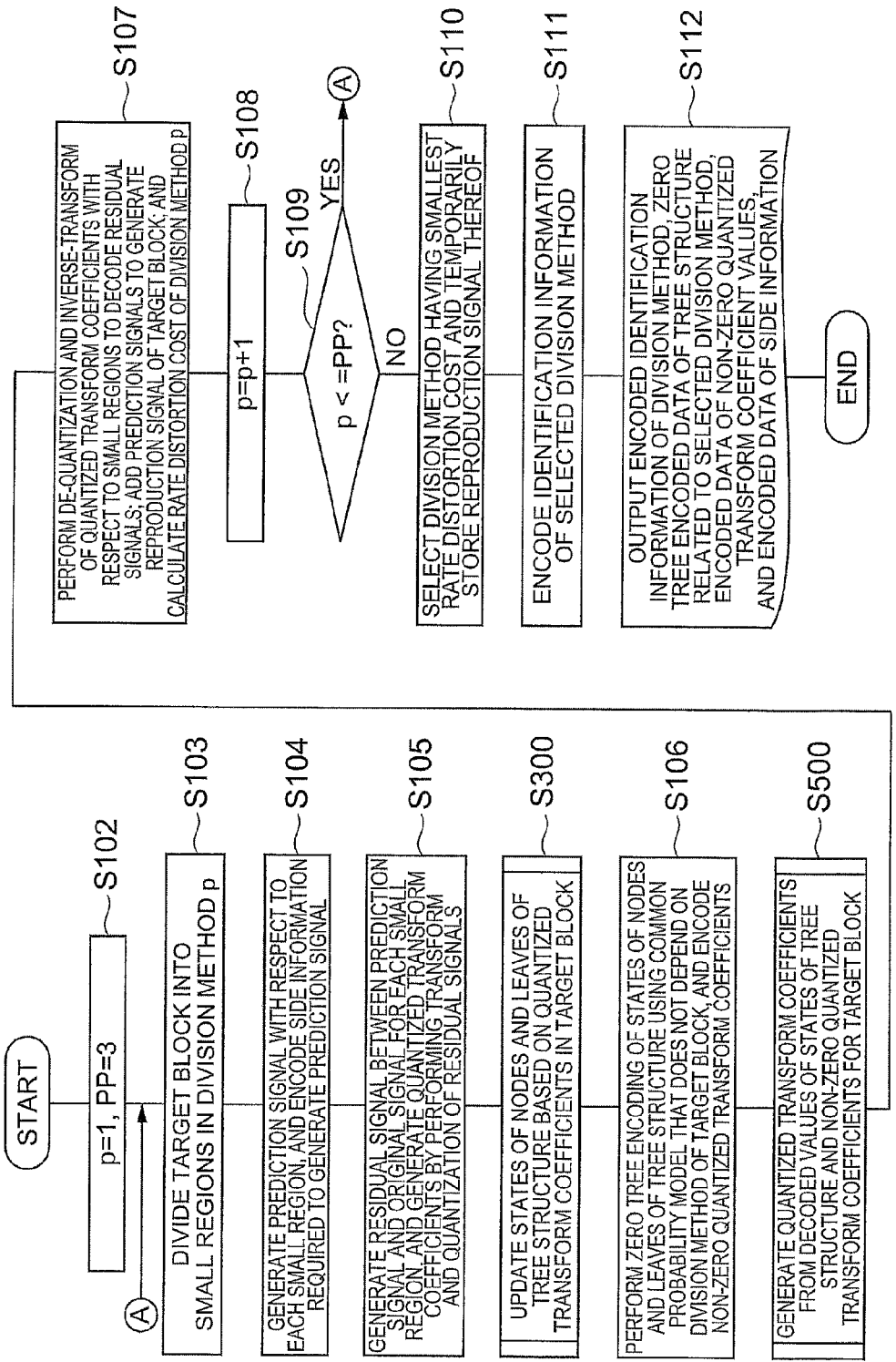
FIG. 10 is a flowchart illustrating a picture encoding method according to an example embodiment.

FIG. 10 is an example of processes that are related to a picture encoding method that may be performed by the picture encoding device 100. In this example, it is assumed that the target block is a 8×8 pixel block.

First, in the picture encoding device 100, the division method selector 110 may initially set a counter p for identifying the division method of the target block to "1" (for example, it is assumed that "1" corresponds to 4×4 pixels, "2" corresponds to 2×8 pixels, and "3" corresponds to 8×2 pixels), and sets a number PP of the division methods to "3", respectively (S102). Accordingly, a selection signal of the division method 1 may be input from the division method selector 110 to the division method switcher 103, and the target block that is divided by the block divider 102 may be output from the division method switcher 103 to the division method 1 prediction encoder 104a.

Next, the division method 1 prediction encoder 104a may divide the target block into sub-blocks (small regions) of 4×4 pixels with the division method 1 (S103). Next, the division method 1 prediction encoder 104a may generate a prediction signal of each of the respective sub-blocks, and encode auxiliary information, such as side information that may be needed to generate the prediction signals (S104). Then, the division method 1 prediction encoder 104a may generate a residual signal between the prediction signal and the picture signal with respect to the respective sub-blocks, and may perform transformation and quantization of the residual signal to generate the quantized transform coefficients of the respective sub-blocks (S105). Further, the division method 1 prediction encoder 104a may perform mapping of the quantized transform coefficients of the target block onto the leaves of the tree structure through the process of S300 as illustrated in the example of FIG. 3, and may update the states of the nodes and leaves of the tree structure in accordance with the coefficient values of the respective leaves (S300).

Next, the zero tree entropy encoder 105 may perform the zero tree encoding of the generated states of the nodes and leaves of the tree structure and may encode the quantized transform coefficient values with respect to the leaves of which the state is "1" (non-zero quantized transform coefficients) using a model, such as a common probability model that is independent of the division method of the target block (S106).

Then, the division method 1 prediction decoder 109a, through a restoration process, such as the process of S500 as illustrated in FIG. 5, may restore the quantized transform coefficients of the respective sub-blocks of the target block from the values of the states of the nodes and leaves of the tree structure and the non-zero quantized transform coefficients, and may perform de-quantization and inverse-transformation of the restored quantized transform coefficients of the respective sub-blocks to generate the residual signals of the respective sub-blocks. In addition, the division method 1 prediction decoder 109a may generate the prediction signals of the respective sub-blocks in a manner similar to the division method 1 prediction encoder 104a, and may add the prediction signals to the residual signals to restore the reproduction signals of the respective sub-blocks. In this example, the picture encoding device 100 calculates rate distortion costs of the reproduction signal of the restored target block and the encoded data based on a predetermined calculation equation (for example, the sum of squares of the difference signal that is obtained by subtracting the picture signal from the reproduction signal of the target block is added to the value that is obtained by multiplying the number of bits of the encoded data by a value that is determined by quantization accuracy) (S107).

Next, the picture encoding device 100 may add "1" to the value of a counter p, and may perform the processes from S103 to S107 as described above with respect to the division method p (that is, division method 2).

When the processes from S103 to S107 are completed with respect to the division methods (such as the three division methods 1, 2, and 3), the value of the counter p becomes "4" in S108, and the value of the counter p becomes larger than the number PP of division methods (here, "3") in S109, so that the proceeding proceeds to S110. In addition, the rate distortion costs in the division methods 1, 2, and 3 may be obtained.

In S110, the division method selector 110 may select a division method having the smallest rate distortion cost among the available division methods, and the reproduction signal of the target block that is generated with the selected division method may be temporarily stored in the frame memory 108. Also, the division method entropy encoder 111 may perform entropy encoding of the identification information of the selected division method (S111).

Further, the picture encoding device 100 may output the identification information of the encoded division method, the zero tree encoded data of the tree structure related to the selected division method and the encoded data of the non-zero quantized transform coefficients, and the encoded data of side information that is used to generate the prediction signal through the output terminal 107 (S112).

Picture Decoding Method

Figure 11:
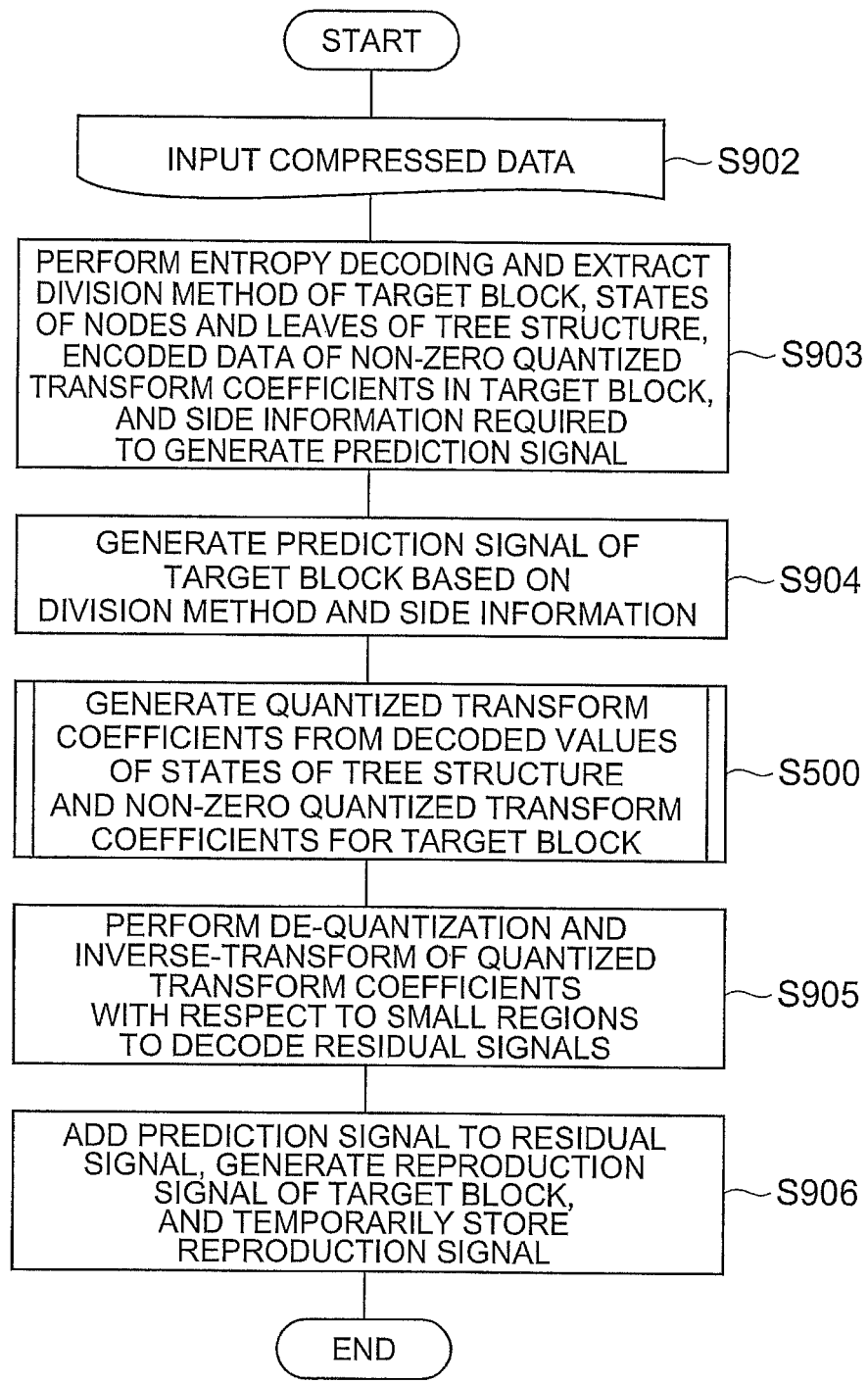
FIG. 11 is a flowchart illustrating a picture decoding method according to an example embodiment.

FIG. 11 is an example of processes that are related to a picture decoding method performed by the picture decoding device 900. In this example it is assumed that the target block is a 8×8 pixel block.

First, in the picture decoding device 900, the data analyzer 902 may extract encoded data of the target block from input compressed data (S902), and the zero tree entropy decoder 903, the non-zero coefficient entropy decoder 904 and the division method entropy decoder 905 may perform entropy decoding of the extracted data, and particularly decode the division method of the target block, the states of the nodes and leaves of the tree structure related to the respective sub-blocks of the target block, the decoded values that correspond to the non-zero quantized transform coefficients (the coefficients that correspond to the leaves of which the state is "1" in the tree structure) of the target block, and information such as side information (side information is not illustrated in FIG. 9) that may be needed to generate the prediction signal (S903). In addition, in the case of the zero tree decoding of the states of the nodes and leaves of the tree structure, a model, such as a common probability model that does not depend on the division method of the target block may be used.

The division method p prediction decoder 109 may generate the prediction signal of the target block based on the restored division method and the side information (S904).

Then, the division method p prediction decoder 109 may transform the states of the nodes and leaves of the tree structure, and the decoded values which correspond to the quantized transform coefficients (non-zero quantized transform coefficients) indicating that the state of the leaves is "1", which are obtained by the decoding, into the quantized transform coefficients of the respective sub-blocks, through the process in S500 as illustrated in FIG. 5.

Further the division method p prediction decoder 109 may perform the de-quantization and the inverse-transform of the quantized transform coefficients of the respective sub-blocks to restore the residual signal (S905).

Further, the division method p prediction decoder 109 may generate the reproduction signals of the respective sub-blocks by adding the prediction signals to the restored residual signals, and may integrate the generated reproduction signals of the respective sub-blocks to restore the reproduction signal of the target block. The restored reproduction signals may be temporarily stored in the frame memory 108 (S906).

Modified Examples of a Map

In S304 of FIG. 3 and in S504 of FIG. 5, a map, which may be used when the quantized transform coefficients are mapped onto the leaves of the tree structure, is selected from among a plurality of maps. Selection of the map may be based on the sub-block division method of the target block. However, the selection method is not limited. If the information can be identified by the picture encoding device, the accompanying attribute information of the target block, or the sub-block, or the decoding information of the adjacent block may be used to select the map.

For example, a map may be prepared, which is classified based on the positions of the sub-blocks in the target block, the number of non-zero coefficients or the non-zero coefficient values of the quantized coefficients of the sub-blocks, the division method of the adjacent target block, the block shapes of the sub-blocks or the number of pixels, and the like. Also, these may be combined with the division methods. Further, in the picture encoding device, it may be selected which map is to be used, and the selection information may be encoded in a frame unit or in a block unit.

In FIGS. 6 to 8, it is exemplified that the number of pixels in the sub-block is constant with respect to the three division methods. However, the present invention can be applied even in the case where the number of sub-blocks or the number of pixels in the sub-block is variable.

Figure 14:
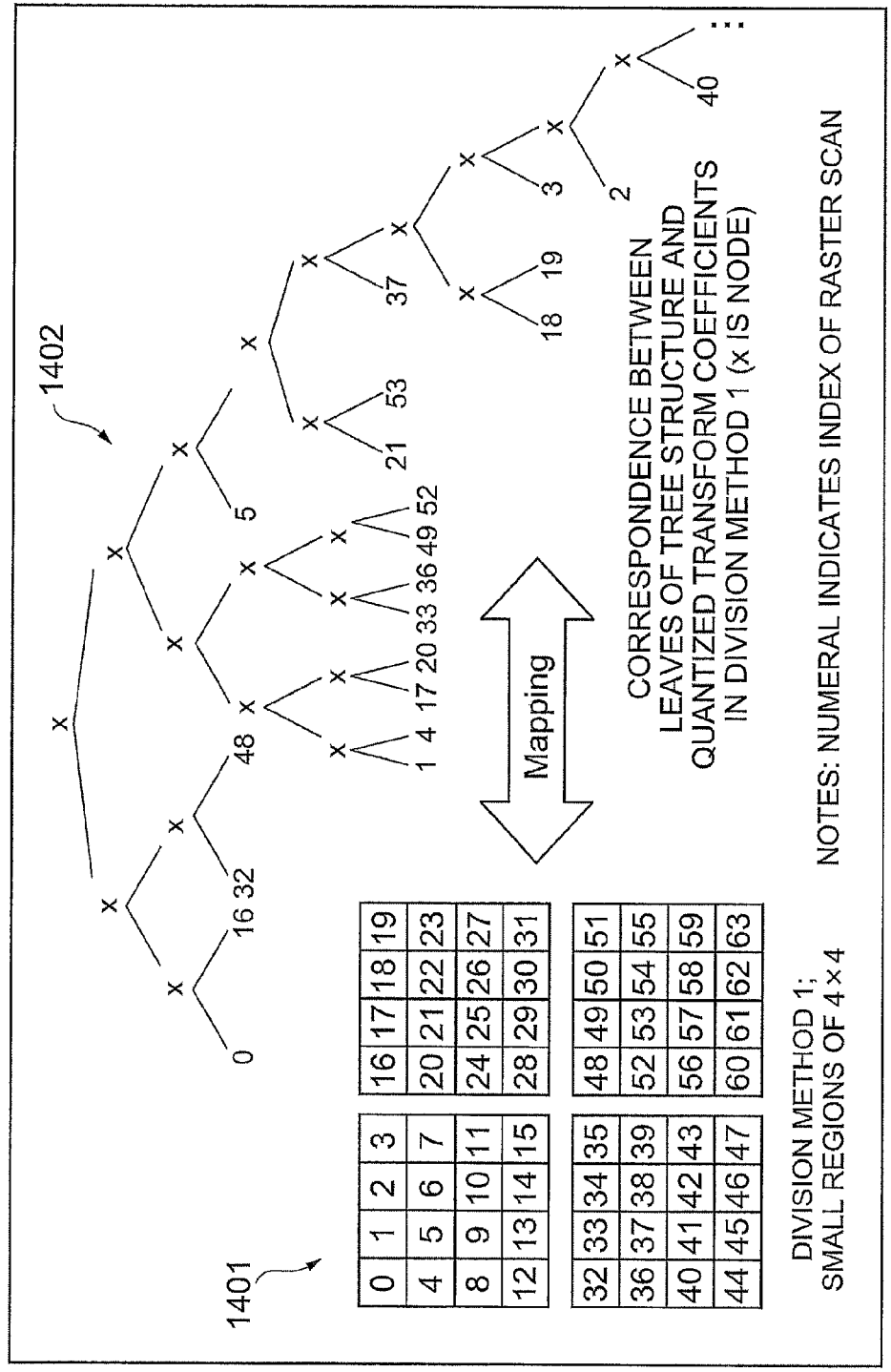
FIG. 14 is a fourth schematic diagram illustrating an example mapping process of quantized transform coefficients onto a tree structure.
Figure 15:
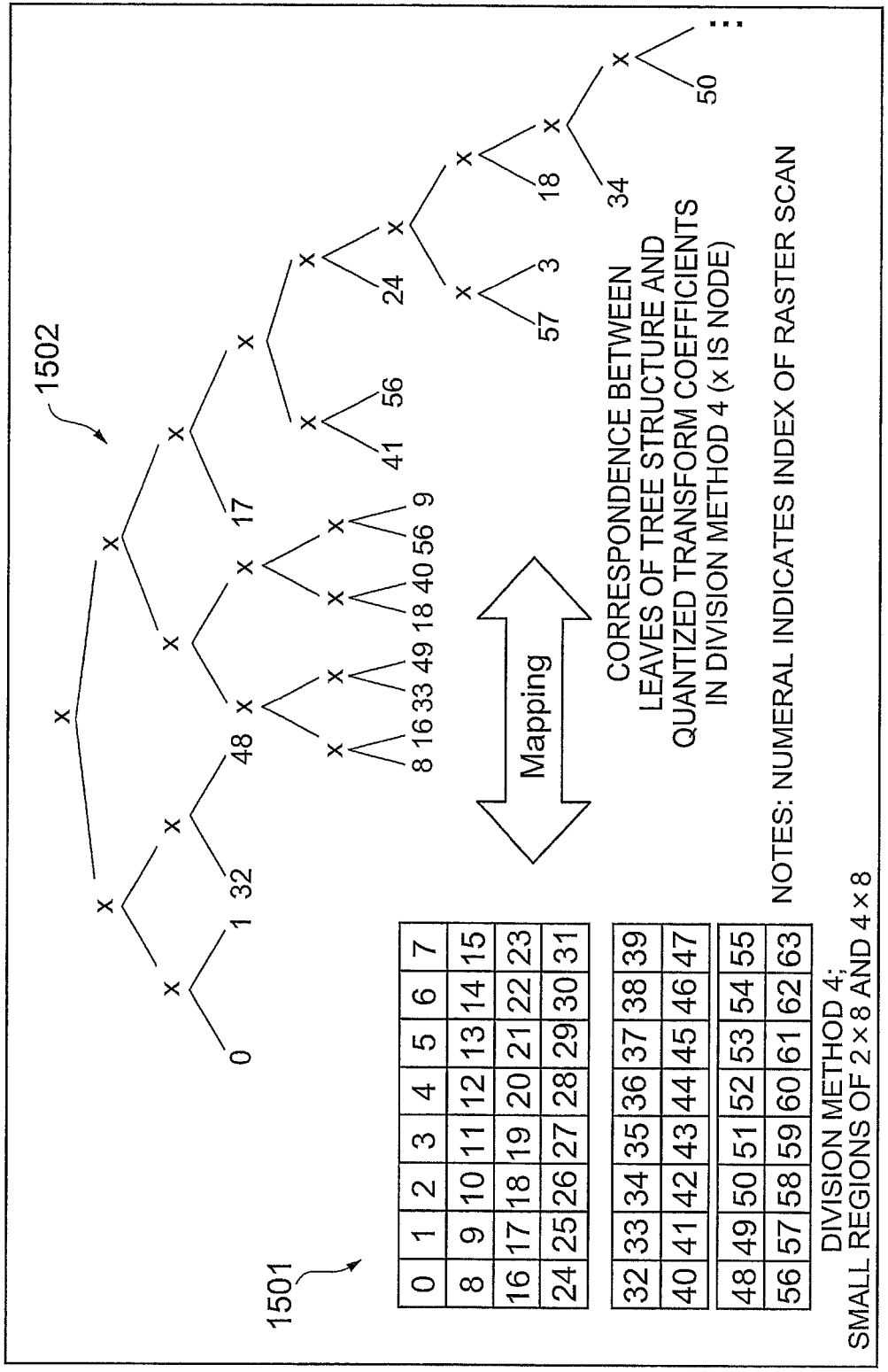
FIG. 15 is a fifth schematic diagram illustrating an example mapping process of quantized transform coefficients onto a tree structure.
Figure 16:
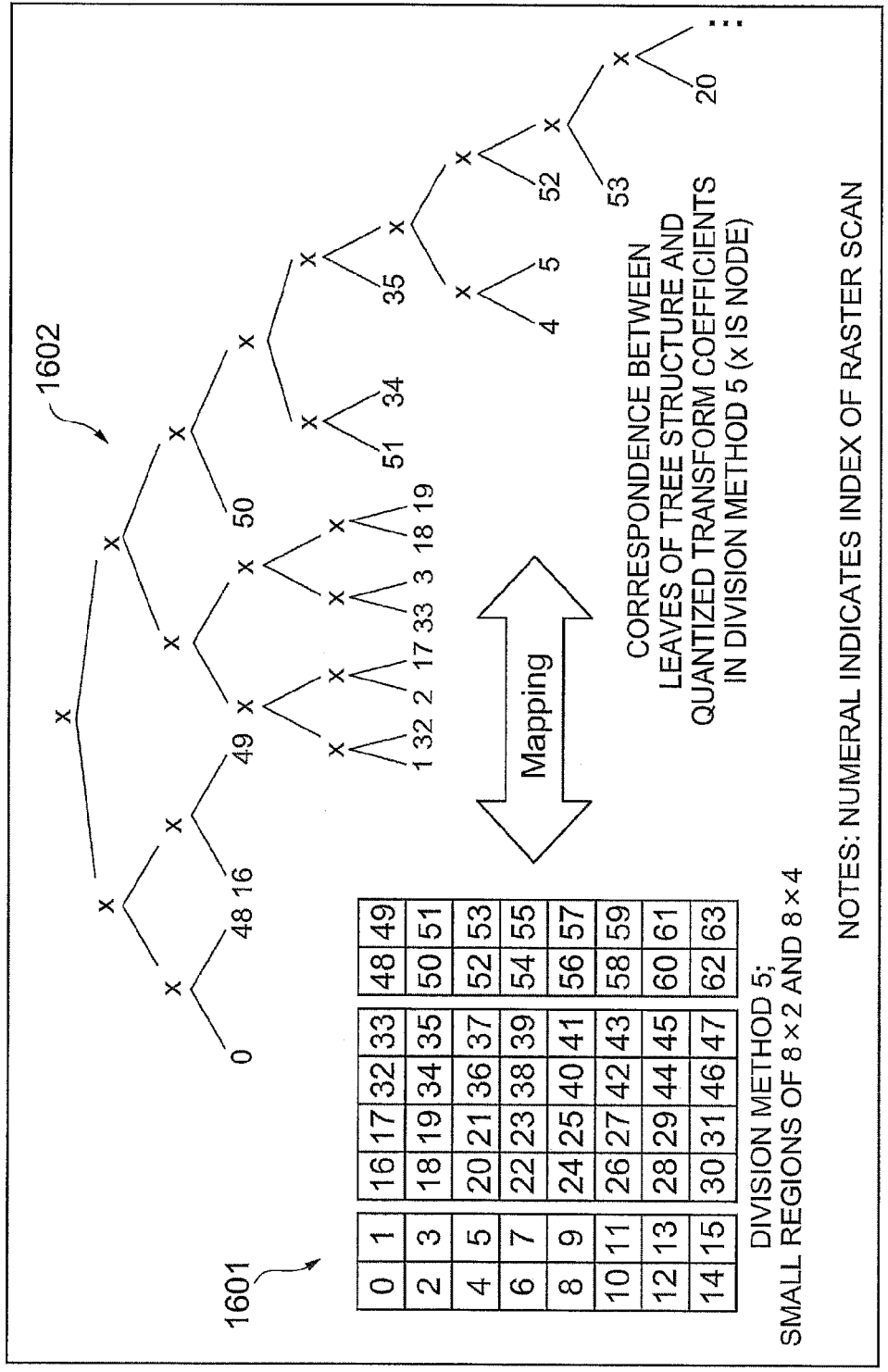
FIG. 16 is a sixth schematic diagram illustrating an example mapping process of quantized transform coefficients onto a tree structure.

In the examples of FIGS. 14 to 16, the target block 1401 of FIG. 14 is divided into four sub-blocks, while the target block 1501 of FIG. 15 and the target block 1601 of FIG. 16 are divided into three sub-blocks. Also, a case where the number of pixels in the sub-block is 16 or 32 is included.

Even in the above-described case, it becomes possible to perform the zero tree encoding with one probability model that does not depend on the division method of the target block by using the common tree structure (the tree 1402 of FIG. 14, the tree 1502 of FIG. 15, and the tree 1602 of FIG. 16) in which the quantized transform coefficients in the target block are mapped onto the leaves.

Figure 12:
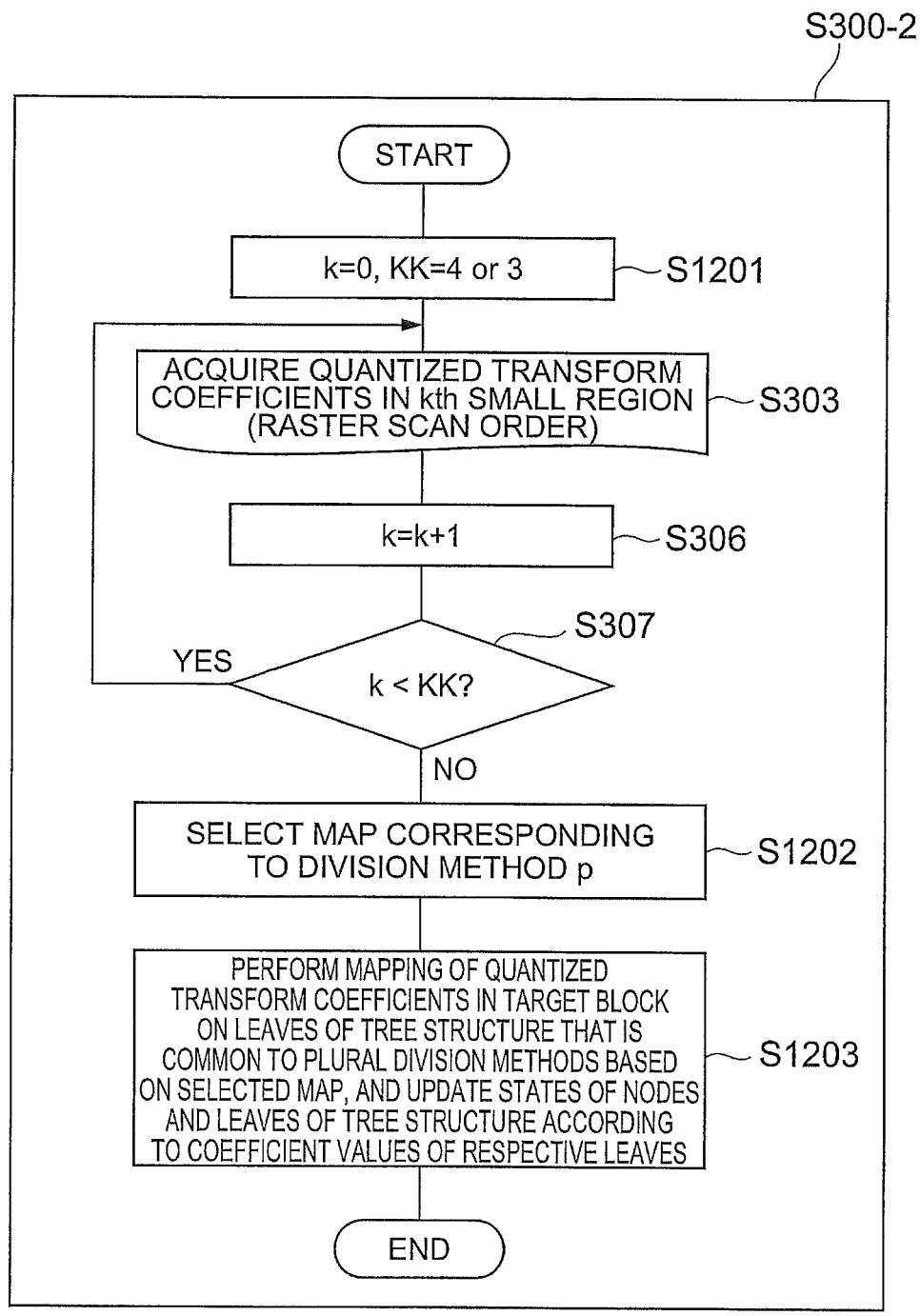
FIG. 12 is a second flowchart illustrating an example mapping process of quantized transform coefficients onto a tree structure.

FIG. 12 is an example flowchart S300-2 illustrating a process of updating the states of the nodes and leaves of the tree structure in the quantized transform coefficient zero tree mapper 206 of FIG. 2 in the case where the tree structure in the target block unit is used. Hereinafter, the process of FIG. 12 will be described.

The quantized transform coefficient zero tree mapper 206 initially sets a value of k (the identification number of the sub-block) to "0" and a value of KK (the number of sub-blocks in the target block) to "4" (the division method 1 of FIG. 14) or "3" (the division method 4 of FIG. 15 and the division method 5 of FIG. 16) in S1201, and acquires the quantized transform coefficients in the $0^{th}$ sub-block in a scan order, such as a raster scan order in S303.

Next, the quantized transform coefficient zero tree mapper 206 may perform the process in S303 with respect to $k^{th}$ (here, $1^{st}$) sub-block by increasing the value of k by "1" in S306. Thereafter, the quantized transform coefficient zero tree mapper 206 repeatedly performs the processes in S303 to S306 until the process in S303 is completed with respect to all sub-pixels (S307).

When the process in S303 is completed with respect to all the sub-blocks, the quantized transform coefficient zero tree mapper 206 may select a map, such as at least one map, that corresponds to the division method p (where, in this example, p is "1", "4", or "5"; see FIGS. 14 to 16) of the target block in S1202, and then may perform mapping of the quantized transform coefficients in the target block onto the leaves of the tree structure based on the selected map (the tree 62, 72, or 82 in FIGS. 6 to 8) in S1203. Thereafter, the quantized transform coefficient zero tree mapper 206 may update the states of the nodes and leaves of the tree structure according to the coefficient values of the respective leaves.

As described in the previous discussed embodiments, even in the case where the number of sub-blocks in the target block or the number of pixels in the sub-block differs, the quantized transform coefficients can be mapped onto the leaves of the common tree structure that does not depend on the division method of the target block, and thus it becomes possible to perform the zero tree encoding with the same tree structure and the same probability model.

In the modified example of the map, the kind and the number of the division methods of the target block are not limited.

Figure 13:
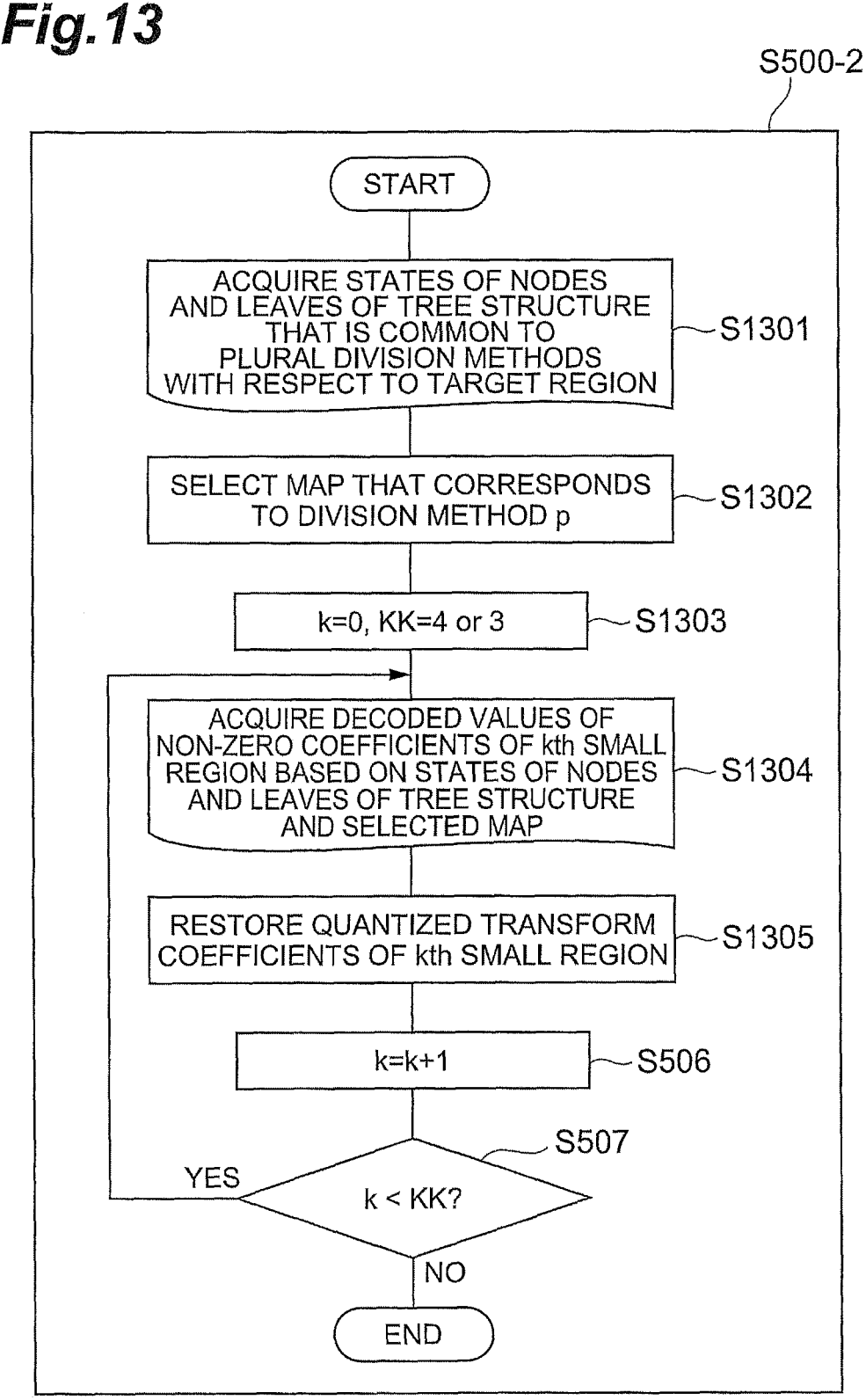
FIG. 13 is a second flowchart illustrating an example mapping process of a tree structure onto quantized transform coefficients.

FIG. 13 is an example flowchart S500-2 illustrating a quantized transform coefficient restoration process in the zero tree quantized transform coefficient mapper 401 of FIG. 4 in the case where the tree structure in the target block unit is used. Hereinafter, the process of FIG. 13 will be described.

The zero tree quantized transform coefficient mapper 401 may initially acquire the states of the nodes and leaves of the tree structure that is common to the plurality of division methods with respect to the quantized transform coefficients in the target block in S1301, and select the map that corresponds to the division method p (p in this example is "1", "4", or "5"; see FIGS. 14 to 16) of the target block in S1302.

Then, the zero tree quantized transform coefficient mapper 401 may initially set the value of k (the identification number of the sub-block) to "0" and the value of KK (the number of sub-blocks in the target block) to "4" (the division method 1 of FIG. 14) or "3" (the division method 4 of FIG. 15 and the division method 5 of FIG. 16) in S1303. Next, the zero tree quantized transform coefficient mapper 401 may acquire the decoded values with respect to the coefficients in the $0^{th}$ sub-block, which correspond to the leaves of the tree structure of which the state is "1" in S1304, and may restore in S1305 the quantized coefficients in the sub-block from the decoded values of the states of the leaves in the tree structure and the non-zero quantized transform coefficients based on the map selected in S1302.

Next, the zero tree quantized transform coefficient mapper 401 may perform the processes in S1304 to S1305 with respect to the $k^{th}$ (here, $1^{st}$) sub-block by increasing the value of k by one in S506. Thereafter, the processes in S1304, S1305, and S506 are repeatedly performed until the processes in S1304 to S1305 with respect to all the sub-blocks are completed (S507).

In an example of FIGS. 12 to 16, 64 quantized transform coefficients in the target block are mapped onto the leaves of the tree structure. However, it is also possible to generate a map so as to generate the tree structure of the respective sub-blocks using a portion of the tree structure. When the nodes and the leaves that are used for the respective sub-blocks based on the block size and shape are predetermined, it becomes possible to equally operate the picture encoding device and the picture decoding device.

Further, it is also possible to use the tree structure in the sub-block unit as illustrated in FIGS. 6 to 8 and the tree structure in the target block unit as illustrated in FIGS. 14 to 16 at substantially the same time. For example, in the intra prediction block, the tree structure in the sub-block unit may be used, while in the inter prediction block, the tree structure in the target block unit may be used. Also, it may be determined for each target block which of the tree structure in the sub-block unit and the tree structure in the target block unit is to be used, and the identification information of the used tree structure may be sent from the picture encoding device to the picture decoding device.

In the above-described embodiment, the tree structure and the probability model for encoding the states of the nodes and leaves of the tree structure may be commonly used without depending on the division method of the target block. However, only one of them may be commonly used. For example, it may be defined that the tree structure is commonly used without depending on the division method of the target block, but the probability mode for encoding the states of the nodes and leaves of the tree structure may differ according to the division method of the target block. On the contrary, the probability model for encoding the states of the nodes and leaves that are being prepared may be commonly used without depending on the division method of the target block, but different tree structures may be used for the division methods of the target block. At this time, a model, such as a probability model, to be used may be selected in advance from one or more models prepared with respect to the nodes and leaves of the respective tree structures, the selection information may be encoded at a frame level or a block level, and the encoded selection information may be sent from the picture encoding device to the picture decoding device.

Picture Encoding Program and a Picture Decoding Program

The picture encoding device may be understood as related to a picture encoding program for causing a computer to function as the picture encoding device. Also, the picture encoding method according to this embodiment may be stored in and provided from a non-transient recording medium as a program. Also, the picture decoding device may be understood as related to a picture decoding program for causing a computer to function as the picture decoding device. Also, the picture decoding method according to this embodiment may be stored in and provided from a non-transient recording medium as a program.

The picture encoding program and the picture decoding program, for example, may be stored in and provided from a recording medium. Examples of the recording medium include a recording medium such as a flexible disk, a CD-ROM, a DVD, or the like, or a recording medium such as a ROM or the like, or a semiconductor memory or the like.

Figure 19:
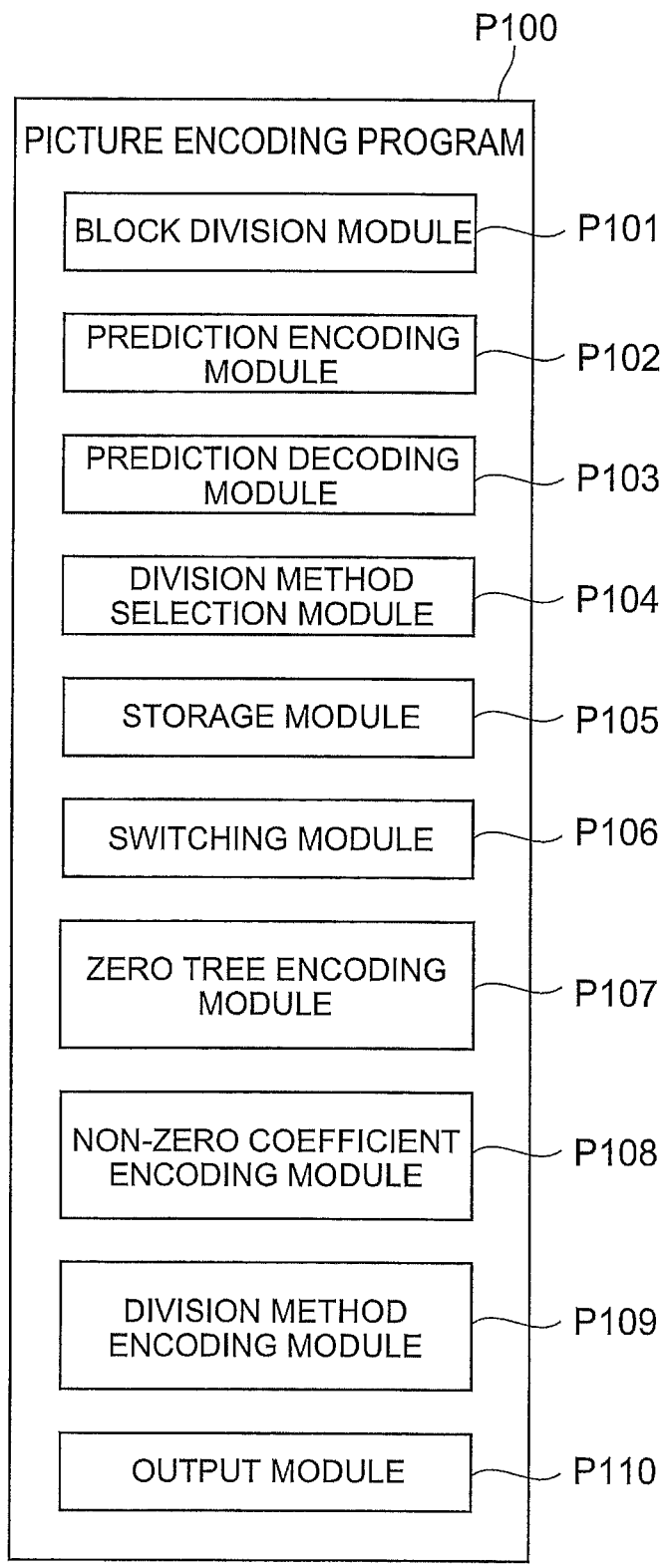
FIG. 19 is a block diagram illustrating a module configuration example of a picture encoding program.
Figure 20:
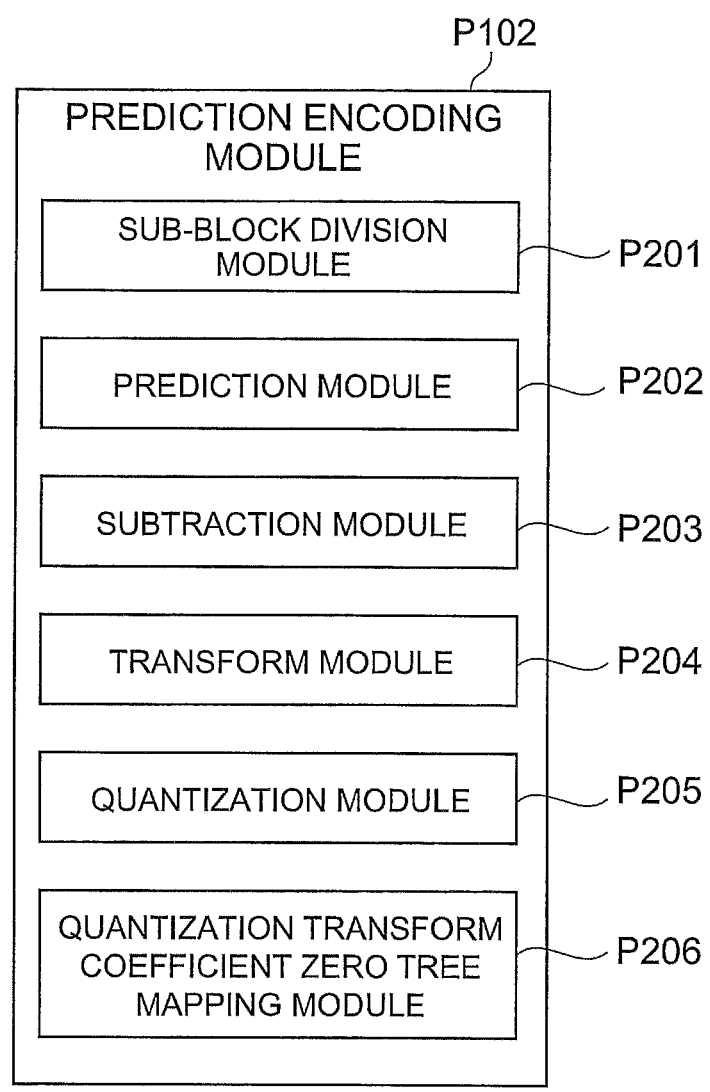
FIG. 20 is a block diagram illustrating a configuration example of a prediction encoding module.

FIG. 19 illustrates modules of an example picture encoding program for causing a computer to function as a picture encoding device. As illustrated in FIG. 19, a picture encoding program P100 includes a block division module P101, a prediction encoding module P102, a prediction decoding module P103, a division method selection module P104, a storage module P105, a switching module P106, a zero tree encoding module P107, a non-zero coefficient encoding module P108, a division method encoding module P109, and an output module P110. Among them, the prediction encoding module P102 may be understood as one program, and as illustrated in FIG. 20, includes a sub-block division module P201, a prediction module P202, a subtraction module P203, a transform module P204, a quantization module P205, and a quantized transform coefficient zero tree mapping module P206.

The functions that are implemented by executing the respective modules are the same as the functions of the picture encoding device 100 of FIG. 1 as described previously. That is, in function, the block division module P101 of FIG. 19 corresponds to the block divider 102 of FIG. 1, the prediction encoding module P102 corresponds to the division method p prediction encoder 104, and the prediction decoding module P103 corresponds to the division method p prediction decoder 109. Also, the division method selection module P104 corresponds to the division method selector 110, the storage module P105 corresponds to the frame memory 108, and the switching module P106 corresponds to the division method switcher 103. Also, the zero tree encoding module P107 corresponds to the zero tree entropy encoder 105, the non-zero coefficient encoding module P108 corresponds to the non-zero coefficient entropy encoder 106, the division method encoding module P109 corresponds to the division method entropy encoder 111, and the output module P110 corresponds to the output terminal 107. Also, the sub-block division module P201 of FIG. 20 corresponds to the small region divider 201 of FIG. 2, the prediction module P202 corresponds to the predictor 202, the subtraction module P203 corresponds to the subtractor 203, the transform module P204 corresponds to the transformer 204, the quantization module P205 corresponds to the quantizer 205, and the quantized transform coefficient zero tree mapping module P206 corresponds to the quantized transform coefficient zero tree mapper 206.

Figure 21:
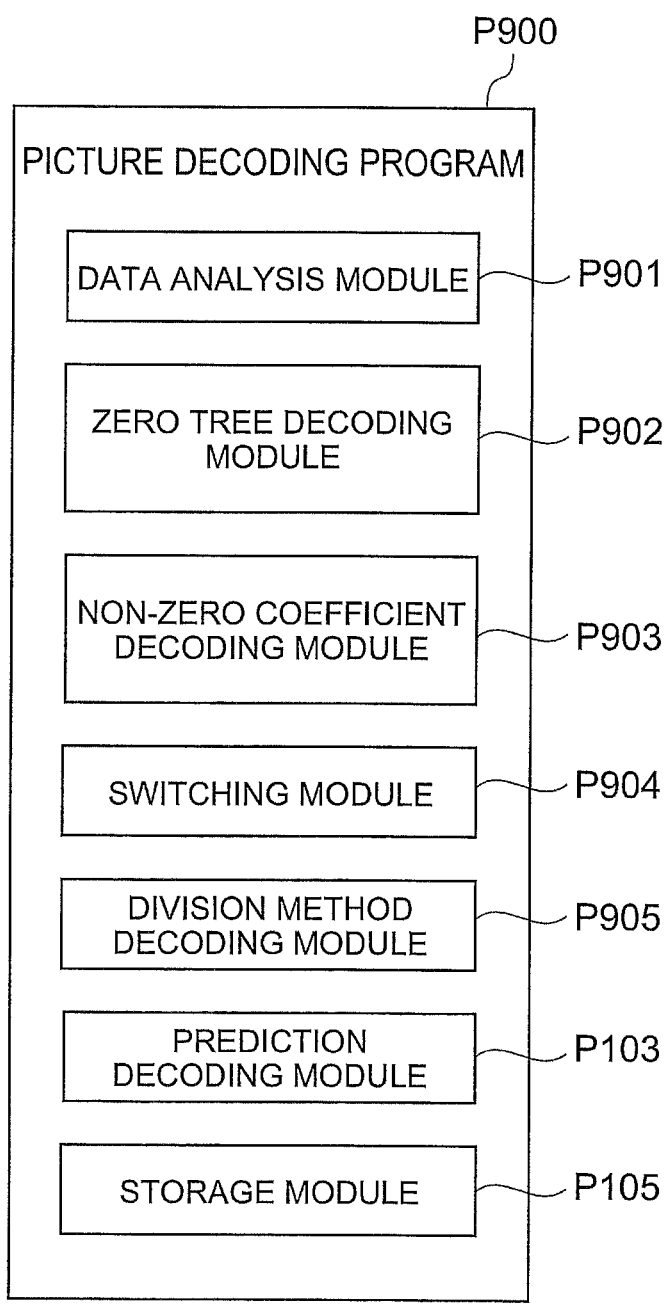
FIG. 21 is a block diagram illustrating a module configuration example of a picture decoding program.
Figure 22:
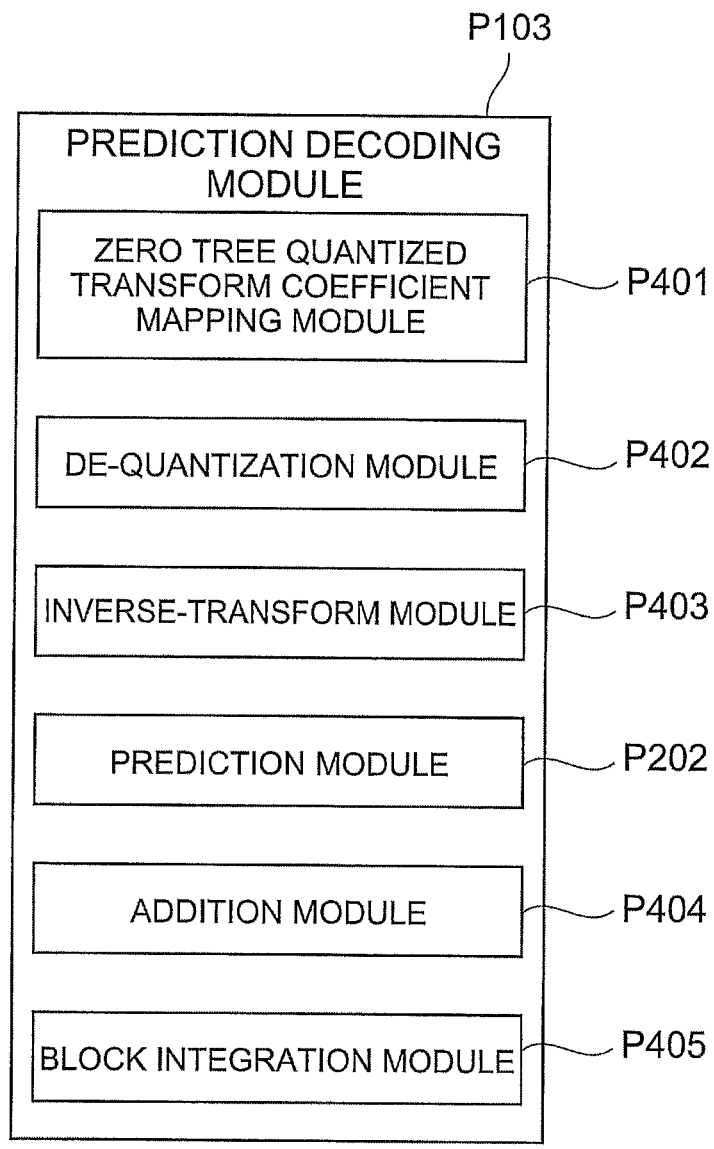
FIG. 22 is a block diagram illustrating a configuration example of a prediction decoding module.

FIG. 21 illustrates modules of a picture decoding program for causing a computer to function as a picture decoding device. As illustrated in FIG. 21, a picture decoding program P900 includes a data analysis module P901, a zero tree decoding module P902, a non-zero coefficient decoding module P903, a switching module P904, a division method decoding module P905, a prediction decoding module P103, and a storage module P105. Among them, the prediction decoding module P103 may be understood as one program, and as illustrated in FIG. 22, may include a zero tree quantized transform coefficient mapping module P401, a de-quantization module P402, an inverse-transform module P403, a prediction module P202, an addition module P404, and a block integration module P405.

The functions that are implemented by executing the respective modules are similar to the functions of the picture decoding device 900 of FIG. 9 as described above. That is, in function, the data analysis module P901 in FIG. 21 corresponds to the data analyzer 902 of FIG. 9, the zero tree decoding module P902 corresponds to the zero tree entropy decoder 903, and the non-zero coefficient decoding module P903 corresponds to the non-zero coefficient entropy decoder 904. Also, the switching module P904 corresponds to the division method switcher 906, the division method decoding module P905 corresponds to the division method entropy decoder 905, the prediction decoding module P103 corresponds to the division method p prediction decoder 109, and the storage module P105 corresponds to the frame memory 108. Also, the zero tree quantized transform coefficient mapping module P401 of FIG. 22 corresponds to the zero tree quantized transform coefficient mapper 401 of FIG. 4, the de-quantization module P402 corresponds to the de-quantizer 402, the inverse-transform module P403 corresponds to the inverse-transformer 403, the prediction module P202 corresponds to the predictor 202, the addition module P404 corresponds to the adder 404, and the block integration module P405 corresponds to the block integrator 405.

The picture encoding program P100 and the picture decoding program P900 as configured above are stored in the recording medium 10 illustrated in FIG. 17, and are executed by a computer 30 to be described later.

Figure 17:
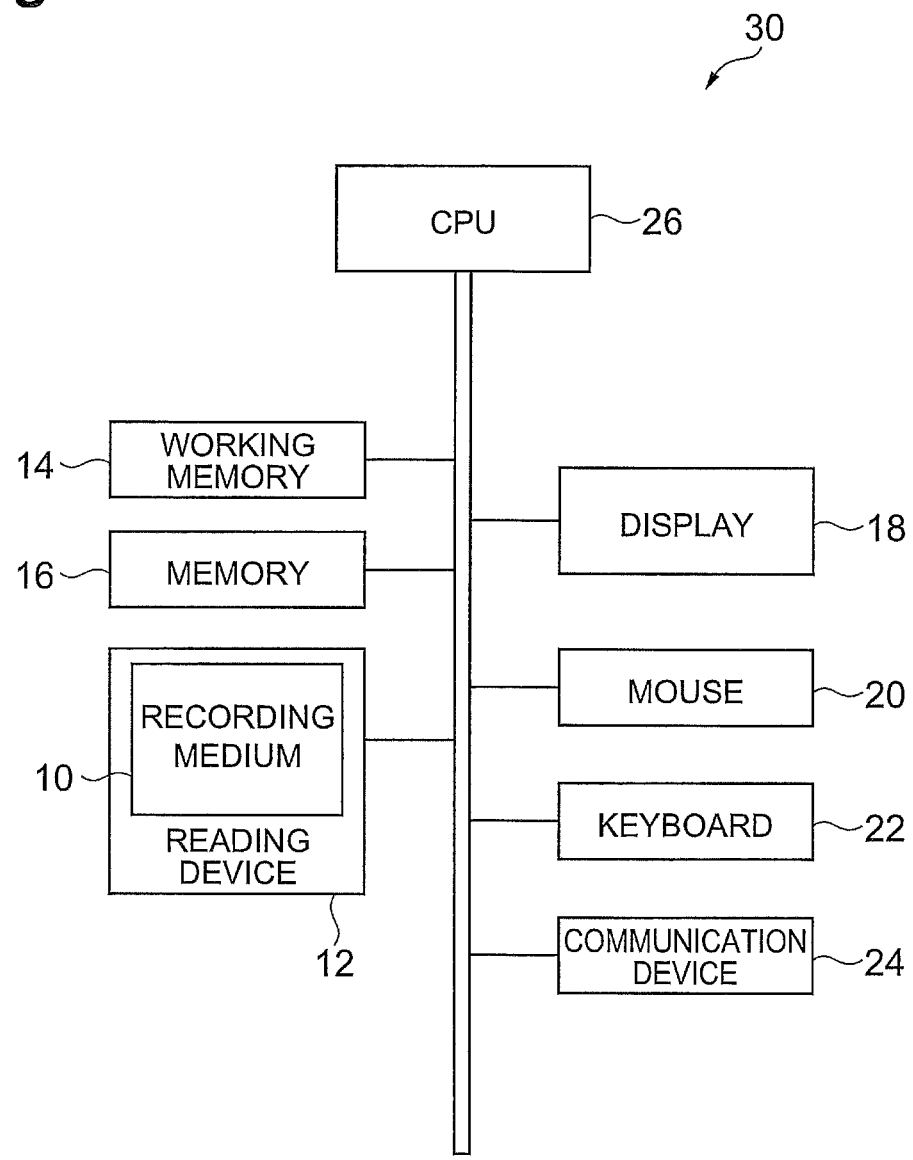
FIG. 17 is a hardware configuration diagram of an example computer.
Figure 18:
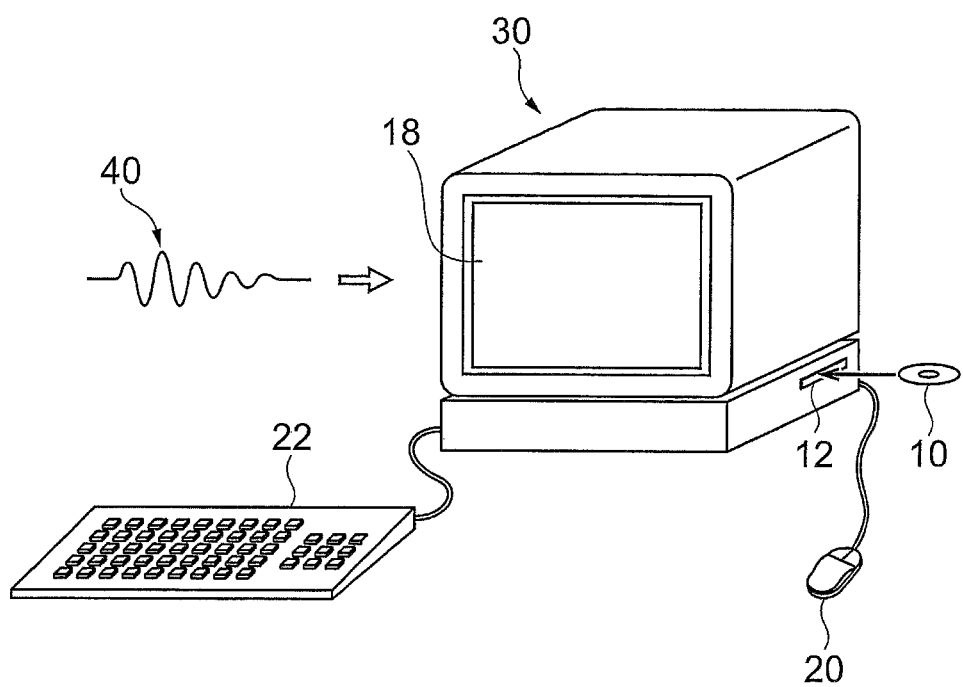
FIG. 18 is a perspective view of the computer of FIG. 17.

FIG. 17 is a hardware configuration diagram of an example computer for executing a program recorded in a recording medium, and FIG. 18 is a perspective view of the computer for executing the program stored in the recording medium. A CPU is provided as the computer, and a DVD player, a set top box, a portable phone, and the like, which perform processes or control by software, are included.

As illustrated in FIG. 17, the computer 30 is provided with a reading device 12, such as a flexible disk drive device, a CD-ROM drive device, a DVD drive device, and the like, a working memory (RAM) 14 in which an operating system resides, a memory 16 storing the program stored in the recording medium 10, a display device 18 such as a display, a mouse 20 and a keyboard 22 that are input devices, a communication device 24 for performing data transmission/reception, and a CPU 26 controlling the execution of the programs. When the recording medium 10 is inserted into the reading device 12, the computer 30 can access the picture encoding program P100 and the picture decoding program P900 stored in the recording medium 10 through the reading device 12, and can operate as the picture encoding device or the picture decoding device by the corresponding picture encoding program P100 and the picture decoding program P900.

As illustrated in FIG. 18, the picture encoding program or the picture decoding program may be provided through a network as a computer data signal 40 superimposed on a carrier signal. In this case, the computer 30 stores the picture encoding program or the picture decoding program received through the communication device 24 in the memory 16, and executes the corresponding picture encoding program or the picture decoding program.

As described above, according to the example embodiments, since the zero tree encoding can be executed with a common tree structure with respect to the prediction signals generated by plural dividing methods, it becomes possible to perform the prediction process with appropriate prediction block sizes or shapes and to efficiently execute the entropy encoding of the residual signal.

REFERENCE SIGNS LIST 101, 901: input terminal;
102: block divider;
103: division method switcher;
104a: division method 1 prediction encoder;
104b: division method 2 prediction encoder;
104c: division method 3 prediction encoder;
105: zero tree entropy encoder;
106: non-zero coefficient entropy encoder;
107, 907: output terminal;
108: frame memory;
109a: division method 1 prediction decoder;
109b: division method 2 prediction decoder;
109c: division method 3 prediction decoder;
110: division method selector;
111: division method entropy encoder;
201: small-region divider;
202: predictor;
203: subtractor;
204: transformer;
205: quantizer;
206: quantized transform coefficient zero tree mapper;
401: zero tree quantized transform coefficient mapper;
402: de-quantizer;
403: inverse-transformer;
404: adder;
405: block integrator;
902: data analyzer;
903: zero tree entropy decoder;
904: non-zero coefficient decoder;
905: division method entropy decoder; and
906: division method switcher.

While various examples of the invention have been described, it will be apparent to those of ordinary skill in the art that many more examples and implementations are possible within the scope of the invention. Accordingly, the invention is not to be restricted except in light of the attached claims and their equivalents.

The invention claimed is:
1. A picture encoding device comprising:
a processor;
a region division unit executable by the processor to divide an input picture into a plurality of regions;
a division method selection unit executable by the processor to select a division method from among a plurality of division methods, the selected division method executable to select a target region from the plurality of regions;
a division method encoding unit executable by the processor to encode information identifying the selected division method;
a small region division unit executable by the processor to divide the target region into a plurality of small regions using the selected division method;
a prediction unit executable by the processor to generate a prediction signal with respect to an original signal, the original signal in a small region included among the small regions;
a residual signal generation unit executable by the processor to generate a residual signal representative of a difference between the prediction signal and the original signal in the small region;
a transform unit executable by the processor to perform frequency transformation of the residual signal in the small region and generation of transform coefficients;
a quantization unit executable by the processor to quantize the transform coefficients of the small region and generate quantized transform coefficients;
a zero tree mapping unit executable by the processor to prepare a tree structure that is common to the plurality of division methods, the tree structure having a plurality of nodes and leaves, the zero tree mapping unit further executable by the processor to select a map from among a plurality of maps to map the quantized transform coefficients of the small region on leaves of the tree structure based on the selected map, and update a state of the nodes and leaves of the tree structure in accordance with the quantized transform coefficients mapped on the respective leaves, the map selected based on the attribute information of the small region;
a zero tree encoding unit executable by the processor to perform entropy encoding of the state of the nodes and leaves of the tree structure with a probability model that is common to the plurality of division methods;
a non-zero coefficient encoding unit executable by the processor to perform entropy encoding of non-zero quantized transform coefficients of the small region; and
an output unit executable by the processor to output encoded data, the encoded data comprising identification of the selected division method, indication of the state of the nodes and leaves of the tree structure, and indication of the non-zero quantized transform coefficients of the small region.

2. The picture encoding device according to claim 1, wherein the attribute information of the small region includes the selected division method of the target region.

3. A picture decoding device comprising:
a processor;
a data analysis unit executable by the processor to extract encoded data from compressed data, the encoded data comprising indication of a division method of a target region to be processed and a residual signal of a small region obtained by dividing the target region, the division method being one of a plurality of division methods;
a division method decoding unit executable by the processor to perform entropy decoding of the encoded data indicating the division method of the target region;
a zero tree decoding unit executable by the processor to prepare a tree structure that is common to the plurality of division methods, the zero tree decoding unit further executable with the processor to perform entropy decoding of a state of a plurality of nodes and a plurality of leaves included in the tree structure using a probability model that is common to the plurality of division methods, the state of the nodes and leaves decoded from the encoded data of the residual signal of the small region;
a non-zero coefficient decoding unit executable by the processor to perform entropy decoding of decoded values of quantized transform coefficients of the decoded small region where the state of the leaves of the decoded tree structure are non-zero, the decoded values of the quantized transform coefficients of the decoded small region decoded from the encoded data of the residual signal of the small region;
a zero tree quantized transform coefficient mapping unit executable with the processor to select a map from among a plurality of maps, the maps for mapping the quantized transform coefficients of the small region on the leaves of the tree structure, the map selected based on fully decoded attribute information of the small region, the zero tree quantized transform coefficient mapping unit further executable with the processor to restore decoded values of the state of the nodes and leaves of the decoded tree structure and the quantized transform coefficients of the decoded small region to reproduction quantized transform coefficients of the small region based on the selected map;

a de-quantization unit executable with the processor to perform de-quantization of the reproduction quantized transform coefficients of the small region and generate reproduction frequency transform coefficients;

an inverse-transform unit executable with the processor to perform inverse-transform of the reproduction frequency transform coefficients of the small region and restore a reproduction residual signal;

a prediction unit executable with the processor to generate a prediction signal with respect to an original signal in the small region; and a picture restoration unit executable with the processor to restore a reproduction signal of the small region by addition of the prediction signal of the small region and the reproduction residual signal.

4. The picture decoding device according to claim 3, wherein the fully decoded attribute information of the small region is the division method of the decoded target region.

5. A picture encoding device comprising:
a region division unit configured to divide an input picture into a plurality of regions;
a division method selection unit configured to select a division method from among a plurality of division methods, the selected division method executable to select a target region from the plurality of regions;
a division method encoding unit configured to encode information identifying the selected division method;
a small region division unit configured to divide the target region into a plurality of respective small regions using the selected division method;
a prediction unit configured to generate a prediction signal with respect to an original signal in each of the respective small regions of the target region;
a residual signal generation unit configured to generate a residual signal representative of a difference between the prediction signal and the original signal in each of the respective small regions of the target region;
a transform unit configured to perform frequency transformation of the residual signal in each of the respective small regions of the target region and generate transform coefficients;
a quantization unit configured to quantize the transform coefficients in the respective small regions of the target region and generate quantized transform coefficients;
a zero tree mapping unit configured to prepare a tree structure having nodes and leaves, the tree structure being common to the plurality of division methods, the zero tree mapping unit further configured to select a map from among a plurality of maps based on attribute information of the target region, the zero tree mapping unit further configured to map the quantized transform coefficients in the target region on the leaves of the tree structure based on the selected map, and update a state of the nodes and leaves of the tree structure in accordance with the quantized transform coefficients mapped on the respective leaves;
a zero tree encoding unit configured to perform entropy encoding of the state of the nodes and leaves of the tree structure using a probability model that is common to the plurality of division methods;
a non-zero coefficient encoding unit configured to perform entropy encoding of non-zero quantized transform coefficients in each of the respective small regions of the target region; and
an output unit configured to output encoded data indicating the selected division method, the state of the nodes and leaves of the tree structure, and the non-zero quantized transform coefficients in each of the respective small regions of the target region.

6. The picture encoding device according to claim 5, wherein the attribute information of the target region is the selected division method of the target region.

7. A picture decoding device comprising:
a data analysis unit configured to extract encoded data indicative of a division method of a target region to be processed, and encoded data indicative of a residual signal of the target region, the encoded data extracted from compressed data, and the division method being one of a plurality of division methods;
a division method decoding unit configured to perform entropy decoding of the division method of the target region from the encoded data indicative of the division method of the target region;
a zero tree decoding unit configured to prepare a tree structure having a plurality of nodes and leaves, the tree structure being common to the division methods, the zero tree decoding unit further configured to perform entropy decoding of a state of the nodes and leaves of the tree structure using a probability model that is common to the plurality of division methods, the state of the nodes and leaves of the tree structure decoded from the encoded data of the residual signal of the target region;
a non-zero coefficient decoding unit configured to perform entropy decoding of decoded values of quantized transform coefficients of the decoded small region, where the state of the leaves of the decoded tree structure are non-zero, the decoded values of the quantized transform coefficients of the decoded small region decoded from the encoded data of the residual signal of the target region;
a zero tree quantized transform coefficient mapping unit configured to select a map from among from a plurality of maps, the map selected based on fully decoded attribute information of the target region, the map for mapping the quantized transform coefficients of the target region on the leaves of the tree structure, the zero tree quantized transform coefficient mapping unit further configured to transform decoded values of the state of the nodes and leaves of the decoded tree structure and the quantized transform coefficients of the decoded target region into reproduction quantized transform coefficients of respective small regions of the target region based on the selected map;
a de-quantization unit configured to perform de-quantization of the reproduction quantized transform coefficients in the respective small regions of the target region and generate reproduction frequency transform coefficients;
an inverse-transform unit configured to perform inverse-transform of the reproduction frequency transform coefficients in the respective small regions of the target region and restore a reproduction residual signal;
a prediction unit configured to generate a prediction signal with respect to an original signal included in each of the respective small regions of the target region;

a picture restoration unit configured to restore the reproduction signal in each of the respective small regions of the target region to generate a reproduced picture signal by addition of the prediction signal in the respective small regions of the target region and the reproduction residual signal; and a region integration unit configured to integrate the reproduced picture signals in the respective small regions of the target region to generate a reproduced picture signal of the target region.

8. The picture decoding device according to claim 7, wherein the fully decoded attribute information of the target region is the division method of the decoded target region.

9. A picture encoding method that is performed by a picture encoding device, comprising steps of:

dividing an input picture into a plurality of regions with a processor;

selecting a target region, the target region selected by the processor from among the plurality of regions;

selecting a division method from among a plurality of division methods, the division method selected with the processor to process the target region;

encoding information with the processor to identify the selected division method;

dividing the target region into a plurality of small regions with the processor using the selected division method;

generating a prediction signal with the processor in accordance with an original signal in a small region included among the small regions;

generating a residual signal with the processor, the residual signal representing a difference between the prediction signal and the original signal in the small region;

performing frequency transformation of the residual signal in the small region to generate transform coefficients with the processor;

quantizing the transform coefficients of the small region with the processor to generate quantized transform coefficients;

preparing a tree structure having a plurality of nodes and a plurality of leaves with the processor, the tree structure being common to the plurality of division methods;

selecting a map based on the selected division method of the target region, the map selected by the processor from among a plurality of maps for mapping the quantized transform coefficients of the small region on the leaves of the tree structure;

the processor mapping the quantized transform coefficients of the small region on the leaves of the tree structure based on the selected map;

the processor updating a state of the nodes and leaves of the tree structure in accordance with the quantized transform coefficients mapped on the respective leaves;

performing entropy encoding of the state of the nodes and leaves of the tree structure, the entropy encoding performed by the processor using a probability model that is common to the plurality of division methods;

performing entropy encoding of non-zero quantized transform coefficients of the small region with the processor; and outputting encoded data with the processor, the encoded data comprising identification of the selected division method, indication of the state of the nodes and leaves of the tree structure, and indication of the non-zero quantized transform coefficients of the small region.

10. A picture decoding method that is performed by a picture decoding device, comprising steps of:

extracting encoded data that indicates a division method of a target region to be processed, and encoded data of a residual signal of a small region that is obtained by dividing the target region, the encoded data extracted by a processor from compressed data, and the division method being one of a plurality of possible division methods;

performing entropy decoding of information identifying the division method of the target region, the division method of the target region decoded by the processor from the encoded data indicating the division method of the target region;

preparing a tree structure having a plurality of nodes and a plurality of leaves with the processor, the tree structure being common to the division methods;

performing entropy decoding of a state of the nodes and leaves of the tree structure using a probability model that is common to the plurality of division methods, the state of the nodes and leaves of the tree structure decoded by the processor from the encoded data of the residual signal of the small region;

performing entropy decoding of decoded values of quantized transform coefficients when the state of the leaves of the decoded tree structure are non-zero, the decoded values of quantized transform coefficients decoded by the processor from the encoded data of the residual signal of the small region;

selecting a map from among a plurality of maps for mapping the quantized transform coefficients of the small region on the leaves of the tree structure, the map selected by the processor based on the division method of the decoded target region;

the processor restoring decoded values of the state of the nodes and leaves of the decoded tree structure and the quantized transform coefficients of the decoded small region to reproduction quantized transform coefficients of the small region based on the selected map;

the processor performing de-quantization of the reproduction quantized transform coefficients of the small region and generating reproduction frequency transform coefficients;

the processor performing inverse-transformation of the reproduction frequency transform coefficients of the small region and restoring a reproduction residual signal;

generating a prediction signal with the processor, the prediction signal generated with respect to an original signal in the small region; and the processor restoring a reproduction signal of the small region by adding the prediction signal of the small region and the reproduction residual signal.

11. A picture encoding method that is performed by a picture encoding device, comprising steps of:

dividing an input picture into a plurality of regions with a processor;

selecting a target region to be processed, the target region selected by the processor from among the plurality of regions;

selecting a division method from among a plurality of division methods, the division method selected by the processor to process the target region;

encoding information with the processor to identify the selected division method;

dividing the target region into a plurality of respective small regions with the processor using the selected division method;
generating a prediction signal with the processor in accordance with an original signal in each of the respective small regions of the target region;
generating a residual signal with the processor based on a difference between the prediction signal and the original signal in the respective small regions of the target region;
the processor performing frequency transformation of the residual signal in the respective small regions of the target region and generating transform coefficients;
the processor quantizing the transform coefficients in the respective small regions of the target region and generating quantized transform coefficients;
preparing a tree structure having a plurality of nodes and a plurality of leaves with the processor, the tree structure being common to the plurality of division methods;
selecting a map based on the selected division method of the target region, the map selected by the processor from among a plurality of maps for mapping the quantized transform coefficients in the target region on the leaves of the tree structure;
the processor mapping the quantized transform coefficients of the target region on the leaves of the tree structure based on the selected map;
the processor updating a state of the nodes and leaves of the tree structure in accordance with the quantized transform coefficients mapped on the respective leaves;
performing entropy encoding of the state of the nodes and leaves of the tree structure, the entropy encoding performed by the processor using a probability model that is common to the plurality of division methods;
performing entropy encoding of non-zero quantized transform coefficients in the respective small regions of the target region with the processor; and
outputting encoded data with the processor, the encoded data comprising identification of the selected division method, indication of the state of the nodes and leaves of the tree structure, and indication of the non-zero quantized transform coefficients in the respective small regions of the target region.

12. A picture decoding method that is performed by a picture decoding device, comprising steps of:
extracting encoded data from compressed data with a processor, the encoded data indicating a division method of a target region to be processed, and encoded data of a residual signal of the target region, the division method being one of a plurality of division methods;
performing entropy decoding of the division method of the target region from the encoded data with the processor;
preparing a tree structure having a plurality of nodes and a plurality of leaves with the processor, the tree structure being common to the division methods;
performing entropy decoding of a state of the nodes and leaves of the tree structure from the encoded data of the residual signal of the target region, the state of the nodes and leaves of the tree structure decoded by the processor with a probability model that is common to the plurality of division methods;
performing entropy decoding of decoded values of quantized transform coefficients when the state of the leaves of the decoded tree structure are non-zero, the decoded values of quantized transform coefficients decoded by the processor from the encoded data of the residual signal of the target region;
selecting a map from among a plurality of maps for mapping the quantized transform coefficients of the target region on the leaves of the tree structure, the map selected by the processor based on the division method of the decoded target region;
the processor transforming decoded values of the states of the nodes and leaves of the decoded tree structure and the quantized transform coefficients of the decoded target region into reproduction quantized transform coefficients of respective small regions of the target region based on the selected map;
the processor performing de-quantization of the reproduction quantized transform coefficients in the respective small regions of the target region and generating reproduction frequency transform coefficients;
the processor performing inverse-transform of the reproduction frequency transform coefficients in the respective small regions of the target region and restoring a reproduction residual signal;
generating a prediction signal with the processor in accordance with an original signal that is included in the small regions of the target region;
the processor restoring a reproduction signal in the small regions of the target region to generate a reproduced picture signal, by adding the prediction signal in the respective small regions of the target region and the reproduction residual signal; and
the processor integrating the reproduced picture signals in the respective small regions of the target region and generating a reproduced picture signal of the target region.

13. A non-transitory computer readable storage medium for a moving image encoding and decoding system, the computer readable storage medium comprising instructions executed by a computer for moving image encoding, the instructions comprising:
a region division unit executed to divide an input picture into a plurality of regions;
a division method selection unit executed to select a division method from among a plurality of division methods, the selected division method executable to select a target region from the plurality of regions;
a division method encoding unit executed to encode information to identify the selected division method;
a small region division unit executed to divide the target region into a plurality of small regions using the selected division method;
a prediction unit executable to generate a prediction signal with respect to an original signal, the original signal included in a small region included among the small regions;
a residual signal generation unit executable to generate a residual signal representative of a difference between the prediction signal and the original signal in the small region;
a transform unit executable to perform frequency transformation of the residual signal in the small region and generate transform coefficients;
a quantization unit executable to quantize the transform coefficients of the small region and generate quantized transform coefficients;
a zero tree mapping unit executable to prepare a tree structure that is common to the plurality of division methods, the tree structure having a plurality of nodes and leaves, the zero tree mapping unit further executable to select a map from among a plurality of maps to map the quantized transform coefficients of the small region on leaves of the tree structure based on the selected map, and update a state of the nodes and leaves of the tree structure in accordance with the quantized transform coefficients mapped on the respective leaves, the map selected based on the selected division method of the target region;

a zero tree encoding unit executable to perform entropy encoding of the state of the nodes and leaves of the tree structure with a probability model that is common to the plurality of division methods;

a non-zero coefficient encoding unit executable to perform entropy encoding of non-zero quantized transform coefficients of the small region; and an output unit executable to output encoded data, the encoded data comprising identification of the selected division method, indication of the state of the nodes and leaves of the tree structure, and indication of the non-zero quantized transform coefficients of the small region.

14. A non-transitory computer readable storage medium for a moving image encoding and decoding system, the computer readable storage medium comprising instructions executed by a computer for moving image decoding, the instructions comprising:

a data analysis unit executable to extract encoded data from compressed data, the encoded data comprising indication of a division method of a target region to be processed and a residual signal of a small region obtained by dividing the target region, the division method being one of a plurality of division methods;

a division method decoding unit executable to perform entropy decoding of the encoded data indicating the division method of the target region;

a zero tree decoding unit executable to prepare a tree structure that is common to the plurality of division methods, the zero tree decoding unit further executable to perform entropy decoding of a state of a plurality of nodes and a plurality of leaves included in the tree structure using a probability model that is common to the plurality of division methods, the state of the nodes and leaves decoded from the encoded data of the residual signal of the small region;

a non-zero coefficient decoding unit executable to perform entropy decoding of decoded values of quantized transform coefficients of the decoded small region, where the state of the leaves of the decoded tree structure are non-zero, the decoded values of the quantized transform coefficients of the decoded small region decoded from the encoded data of the residual signal of the small region;

a zero tree quantized transform coefficient mapping unit executable to select a map from among a plurality of maps, the maps for mapping the quantized transform coefficients of the small region on the leaves of the tree structure, the map selected based on fully decoded attribute information of the small region, the zero tree quantized transform coefficient mapping unit further executable to restore decoded values of the state of the nodes and leaves of the decoded tree structure and the quantized transform coefficients of the decoded small region to reproduction quantized transform coefficients of the small region based on the selected map;

a de-quantization unit executable to perform de-quantization of the reproduction quantized transform coefficients of the small region and generate reproduction frequency transform coefficients;

an inverse-transform unit executable to perform inverse-transformation of the reproduction frequency transform coefficients of the small region and restore a reproduction residual signal;

a prediction unit executable to generate a prediction signal with respect to an original signal in the small region; and a picture restoration unit executable to restore the reproduction signal of the small region by addition of the prediction signal of the small region and the reproduction residual signal.

15. A non-transitory computer readable storage medium for a moving image encoding and decoding device, the computer readable storage medium comprising instructions executed by a computer for moving image encoding, the instructions comprising:

a region division unit executable to divide an input picture into a plurality of regions;

a division method selection unit executable to select a division method from among a plurality of division methods, the selected division method executable to select a target region from among the plurality of regions;

a division method encoding unit executable to encode information identifying the selected division method;

a small region division unit executable to divide the target region into a plurality of respective small regions using the selected division method;

a prediction unit executable to generate a prediction signal with respect to an original signal in each of the respective small regions of the target region;

a residual signal generation unit executable to generate a residual signal representative of a difference between the prediction signal and the original signal in each of the respective small regions of the target region;

a transform unit executable to perform frequency transformation of the residual signal in the respective small regions of the target region and generate transform coefficients;

a quantization unit executable to quantize the transform coefficients in the respective small regions of the target region and generate quantized transform coefficients;

a zero tree mapping unit executable to prepare a tree structure having nodes and leaves, the tree structure being common to the plurality of division methods, the zero tree mapping unit further executable to select a map from among a plurality of maps based on attribute information of the target region, the zero tree mapping unit further executable to map the quantized transform coefficients in the target region on the leaves of the tree structure based on the selected map, and update the state of the nodes and leaves of the tree structure in accordance with quantized transform coefficients mapped on the respective leaves;

a zero tree encoding unit executable to perform entropy encoding of the state of the nodes and leaves of the tree structure using a probability model that is common to the plurality of division methods;

a non-zero coefficient encoding unit executable to perform entropy encoding of non-zero quantized transform coefficients in the respective small regions of the target region; and an output unit executable to output encoded data indicating the selected division method, the state of the nodes and leaves of the tree structure, and the non-zero quantized transform coefficients in each of the respective small regions.

16. A non-transitory computer readable storage medium for a moving image encoding and decoding device, the computer readable storage medium comprising instructions executed by a computer for moving image decoding, the instructions comprising:
- a data analysis unit executable to extract encoded data indicative of a division method of a target region to be processed, and encoded data indicative of a residual signal of the target region, the encoded data extracted from compressed data, and the division method being one of a plurality of division methods;
- a division method decoding unit executable to perform entropy decoding of the division method of the target region from the encoded data indicative of the division method of the target region;
- a zero tree decoding unit executable to prepare a tree structure having a plurality of nodes and leaves, the tree structure common to the division methods, the zero tree decoding unit further executable to perform entropy decoding of a state of the nodes and leaves of the tree structure using a probability model that is common to the plurality of division methods, the state of the nodes and leaves of the tree structure decoded from the encoded data of the residual signal of the target region;
- a non-zero coefficient decoding unit executable to perform entropy decoding of decoded values of quantized transform coefficients of the decoded small region where the state of the leaves of the decoded tree structure are non-zero, the decoded values of the quantized transform coefficients of the decoded small region decoded from the encoded data of the residual signal of the target region;
- a zero tree quantized transform coefficient mapping unit executable to select a map from among from a plurality of maps, the map selected based on the division method of the decoded target region, the map for mapping the quantized transform coefficients of the target region on the leaves of the tree structure, the zero tree quantized transform coefficient mapping unit further executable to transform decoded values of the state of the nodes and leaves of the decoded tree structure and the quantized transform coefficients of the decoded target region into reproduction quantized transform coefficients of respective small regions of the target region based on the selected map;
- a de-quantization unit executable to perform de-quantization of the reproduction quantized transform coefficients in the respective small regions of the target region and generate reproduction frequency transform coefficients;
- an inverse-transform unit executable to perform inverse-transform of the reproduction frequency transform coefficients in the respective small regions of the target region and restore a reproduction residual signal;
- a prediction unit executable to generate a prediction signal with respect to an original signal in each of the respective small regions of the target region;
- a picture restoration unit executable to restore the reproduction signal in each of the small regions of the target region and generate a reproduced picture signal by addition of the prediction signal in the respective small regions of the target region and the reproduction residual signal; and
- a region integration unit executable to integrate the reproduced picture signals in the respective small regions of the target region and generate a reproduced picture signal of the target region.

* * * * *